US011126580B2

(12) United States Patent
Ilijic et al.

(10) Patent No.: US 11,126,580 B2
(45) Date of Patent: *Sep. 21, 2021

(54) SYSTEMS, APPARATUSES AND METHODS FOR DUAL LINE INBOUND DETECTION ON A DATA COMMUNICATION BUS

(71) Applicant: Hubbell Incorporated, Shelton, CT (US)

(72) Inventors: Nik Ilijic, Glen Alpine (AU); Andrew Rhydian Jones, North Turramarra (AU)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/781,393

(22) Filed: Feb. 4, 2020

(65) Prior Publication Data

US 2020/0250123 A1    Aug. 6, 2020

Related U.S. Application Data

(63) Continuation of application No. 16/320,419, filed as application No. PCT/US2016/063838 on Nov. 28, 2016, now Pat. No. 10,552,361.

(Continued)

(51) Int. Cl.
*G06F 13/40* (2006.01)
*G06F 1/12* (2006.01)
(Continued)

(52) U.S. Cl.
CPC ......... *G06F 13/4072* (2013.01); *G05B 19/00* (2013.01); *G06F 1/12* (2013.01);
(Continued)

(58) Field of Classification Search
CPC ........ G06F 13/4073; G06F 1/12; G06F 13/00; G06F 13/16; G06F 13/20; G06F 13/36; G06F 13/4295; G05B 19/00
(Continued)

(56) References Cited

U.S. PATENT DOCUMENTS 4,418,333 A * 11/1983 Schwarzbach .... H02J 13/00007
340/4.3
4,697,098 A * 9/1987 Cloke .................. H03K 5/1532
327/79

(Continued)

OTHER PUBLICATIONS

International Search Report dated Feb. 16, 2017, which issued in the corresponding PCT Patent Application No. PCT/US2016/063838.
(Continued)

*Primary Examiner* — Paul R. Myers
(74) *Attorney, Agent, or Firm* — Dickinson Wright PLLC

(57) ABSTRACT

An input/output (I/O) and control system for long distance communications and industrial applications is provided having a two wire bus and bus protocol for communications between field devices and a channel generator for monitoring and control of the field devices. The channel generator produces an offset square wave on the bus, and sends a synchronization pulse of selected duration at the start of each bus scan cycle in a pulse train cycle to reset counters in the field devices before the bus scan cycle is repeated, to ensure field devices are synchronized, transmitters transmit on the correct channel, and receivers sample the pulse cycle at the correct time. High side and low side current detectors for respective ones of the two wires of the bus and an algorithm are provided to improve detection of valid inbound transmissions by the channel generator for increased noise immunity.

11 Claims, 20 Drawing Sheets

Related U.S. Application Data

(60) Provisional application No. 62/367,266, filed on Jul. 27, 2016.

(51) Int. Cl.
| | | |
|---|---|---|
| *G06F 13/42* | (2006.01) | |
| *G06F 13/00* | (2006.01) | |
| *G06F 13/36* | (2006.01) | |
| *G05B 19/00* | (2006.01) | |
| *G06F 13/20* | (2006.01) | |
| *G06F 13/16* | (2006.01) | |

(52) U.S. Cl.
CPC .............. *G06F 13/00* (2013.01); *G06F 13/16* (2013.01); *G06F 13/20* (2013.01); *G06F 13/36* (2013.01); *G06F 13/4295* (2013.01)

(58) Field of Classification Search
USPC ........................................................ 710/314
See application file for complete search history.

(56) References Cited

U.S. PATENT DOCUMENTS

| | | | | |
|---|---|---|---|---|
| 4,792,950 A | * | 12/1988 | Volk | G06F 11/2007 307/10.1 |
| 5,019,724 A | * | 5/1991 | McClure | H03K 5/1252 326/29 |
| 5,164,663 A | * | 11/1992 | Alcorn | G01R 31/31924 324/73.1 |
| 5,355,391 A | * | 10/1994 | Horowitz | G06F 13/4072 375/257 |
| 5,659,689 A | * | 8/1997 | Sarangdhar | G06F 13/368 710/107 |
| 5,841,580 A | * | 11/1998 | Farmwald | G11C 7/1072 365/194 |
| 6,194,965 B1 | * | 2/2001 | Kruczkowski | H03K 5/2481 327/307 |
| 6,278,357 B1 | * | 8/2001 | Croushore | H04B 3/54 340/534 |
| 6,502,212 B1 | * | 12/2002 | Coyle | G06F 11/221 710/15 |
| 7,756,917 B2 | * | 7/2010 | DeHart | H04L 29/12207 709/200 |
| 2002/0001307 A1 | * | 1/2002 | Nguyen | H04L 41/0856 370/386 |
| 2003/0174724 A1 | * | 9/2003 | Olson | G06F 13/4072 370/420 |
| 2006/0236147 A1 | * | 10/2006 | Best | G06F 1/12 713/400 |
| 2007/0201104 A1 | * | 8/2007 | Kihara | H04L 25/40 358/434 |
| 2010/0265045 A1 | | 10/2010 | Dehart et al. | |
| 2012/0166826 A1 | * | 6/2012 | Flachs | G06F 13/36 713/310 |
| 2013/0301690 A1 | * | 11/2013 | Shrestha | H04L 25/0268 375/219 |

OTHER PUBLICATIONS

Benini et al., "Architectures and Synthesis Algorithms for Power-Efficient Bus Interfaces", IEEE Transactions on Computer Aided Design of Integrated Circuits and Systems, vol. 19, No. 9, Sep. 2000, pp. 969-979.

* cited by examiner

| Direction | Value | Scan Cycle A | | Scan Cycle B | |
|---|---|---|---|---|---|
| | | Chan-X1 | Chan-X2 | Chan-X1 | Chan-X2 |
| Incoming | ON | Space | Mark | Mark | Space |
| | OFF | Mark | Space | Space | Mark |
| | Fault | Mark | Mark | Mark | Mark |
| | Missing | Space | Space | Space | Space |
| Outgoing | ON | Space | Mark | Mark | Space |
| | OFF | Mark | Space | Space | Mark |

FIG. 6B

SYSTEMS, APPARATUSES AND METHODS FOR DUAL LINE INBOUND DETECTION ON A DATA COMMUNICATION BUS

This application is a continuation of U.S. patent application Ser. No. 16/320,419, filed Jan. 24, 2019, which is a national stage entry of international PCT application PCT/US2016/063838, filed Nov. 28, 2016, which claims the benefit of U.S. provisional application Ser. No. 62/367,266, filed Jul. 27, 2016, the contents of each of these applications being incorporated herein by reference in their entirety.

BACKGROUND OF THE INVENTION

Field of the Invention

The present invention relates to systems, methods and apparatuses for apparatuses for dual line inbound detection on a data communication bus.

Description of Related Art

Modern conveyors such as those employed in mining and manufacturing operations can exceed 4 kilometers (km) in underground installations and 10 km in overland installations. General conveyor operational parameters are monitored along the entire length of the installation, these include: belt wander, belt tear, belt slip and bearing temperatures, to name a few. These parameters are often difficult to monitor given the distances involved and the lack of power. Further, in the operation of any conveyor installation, there is a need for safety functions such as stopping the conveyor in an emergency situation, and safely remote isolating the conveyor for maintenance purposes, among other operations.

In addition, conveyor installations are, by their nature, hostile environments for any electrical equipment and cabling that may be installed on their superstructure. The equipment and particularly the cabling is subject to vibration, dust, falling material, rain, extremes in temperature and exposure to radiation, all of which can result in the introduction of electrical faults that can compromise the integrity and safety of these monitoring systems and require fast reaction times (e.g., for a controller to accomplish a basic emergency stop and isolation function at a remotely monitored device deployed along the conveyor).

SILBUS is an example of an existing input/output (I/O) and control system having a data communication bus deployed between a controller and field devices along a conveyor or other industrial system having equipment and/or monitored sensors distributed over or along a geographically large area or long distance for industrial applications and often in harsh environments. SILBUS is commercially available from Austdac Pty Ltd, an affiliate of Hubbell Incorporated, with offices in New South Wales and Queensland in the Commonwealth of Australia and in Pittsburgh, Pa. in the United States of America. SILBUS is a family of intrinsically safe (IS) fieldbus products designed for use in hazardous area underground mining or similar industrial applications. SILBUS provides data transmission and power on twisted pair wires for monitoring and control in industrial systems that are, for example, as many as 10 km in length, including a control unit or channel generator that is in communication with a range of distributed modules (i.e., input and output devices) that monitor a range of signals such as digital, safety transmitters, voltage, current, temperature, and frequency.

The Austdac SILBUS method of conveyor monitoring and control uses a one cable approach to both monitoring and control of long distance conveyors with long distance transmission over 10 km, for example. SILBUS employs a transmission method which allows for the combined transmission of safety-rated (e.g., SIL3 according to the International Standard IEC 61508 or its Australian edition, AS 61508) conveyor emergency stop signals with monitoring and control signals for field devices such as belt alignment switches, tilt switches, belt rip switches, as well as analog values relating to bearing temperature and vibration.

In SILBUS, all safety and standard digital inputs are down line powered, eliminating the need for external power along the length of conveyor. For example, one field device that is commonly deployed along a conveyor is a pull key, which is used to provide controlled stop functions for distributed plant conveyors. The Austdac pull key or cable-pull limit switch type ESS3 has many applications in controlling a distributed plant such as conveyors or belts used in mining or materials handling industries. The pull key can be operated using a front, centrally-located knob or each of two side-located, flexible cable-pull actuators. The side cable-pull actuators can be used in tensioned and non-tensioned systems. The control and monitoring transmitters in a pull key are system powered, such that no external power source needs to be connected along the length of the conveyor.

SILBUS, however, has limitations in terms of noise immunity (e.g., from variable frequency drives), and limitations with respect to the number of channels for input and output devices, as well as limitations on transmission distances on large overland conveyors, and line powering of the distributed devices. For example, many large motors are used to power conveyors; these motors are switched on and off, change speed from low to high and trip off on overload. Variable speed motor drives are also employed. Because these activities all take place at the end of relatively long supply cables, the electrical environment is characterized by the presence of large switching transients, general electrical noise and harmonics.

A need therefore exists for a distributed I/O system that has improved noise immunity. Further, a need exists for an improved system and method of detecting inbound transmissions from field devices on a two-wire data communications bus in a distributed I/O system to accurately and reliably detect valid inbound transmissions, even in the presence of noise, while minimizing false detection of noise as an inbound transmission.

SUMMARY OF THE INVENTION

The above and other problems are overcome, and additional advantages are realized, by illustrative embodiments of the present invention.

In accordance with illustrative embodiments of the present invention, methods and systems are provided to determine if a device has sent a valid inbound transmission on a bus that interfaces a control unit to plural devices connected to the bus. The bus is a two wire bus having a signal line and a common return line. The control unit is configured to generate a pulse train comprising: a plurality of cycles for transmission on the bus, each of the cycles comprising a low voltage level portion for a designated period of time and a high voltage level portion for a designated period of time, and at least some of the cycles corresponding to respective channel windows assigned to respective ones of the plural devices as I/O channels; and bus scan cycles that each comprise a selected number of the I/O channels, and a synchronization pulse. The synchronization pulse is configured to ensure that the plural devices transmit and receive on their corresponding I/O channels and that the control unit samples the pulse train at a correct channel window or pulse corresponding to a selected one of the plural devices. Each of the plural devices is configured to indicate an inbound transmission to the control unit by pulling down the signal line to a designated low voltage level during the low voltage level portion of its corresponding cycle. The method comprises operating a high side current detector to detect current on the signal line; operating a low side current detector to detect current on the common return line; designating a signal threshold; designating at least part of the low voltage level portion in each of the I/O channels to be that channel's inbound detection period; determining an average for a designated number of samples of the current detected by the high side current detector during a channel's inbound detection period; determining an average for a designated number of samples of the current detected by the low side current detector during the channel's inbound detection period; and determining an inbound transmission to be valid if the average of the samples from the low side current detector and the average of the samples from the high side current detector are both greater than the signal threshold.

In accordance with another illustrative embodiment of the present invention, the method comprises: operating a high side current detector to detect current on the signal line; operating a low side current detector to detect current on the common return line; designating a high side signal threshold and a low side signal threshold; designating at least part of the low voltage level portion in each of the I/O channels to be that channel's inbound detection period; determining an average for a designated number of samples of the current detected by the high side current detector during a channel's inbound detection period; determining an average for a designated number of samples of the current detected by the low side current detector during the channel's inbound detection period; and determining an inbound transmission to be valid if one of averages comprising the average of the samples from the low side current detector and the average of the samples from the high side current detector is greater than the high side signal threshold and the other one of the averages is greater than the low side signal threshold.

In accordance with aspects of illustrative embodiments of the present invention, a signal on the bus is determined to not be a valid inbound transmission when outputs from either one of the low side current detector and the high side current detector fails to meet one of the high side signal threshold and the low side signal threshold.

In accordance with aspects of illustrative embodiments of the present invention, the low side current detector is disabled during the high voltage pulse in the I/O channels.

In accordance with aspects of illustrative embodiments of the present invention, the pulse train is an offset square wave and the high voltage level pulse is between 12 VDC and 48 VDC and the low voltage level portion is between 2 VDC and 9 VDC.

In accordance with aspects of illustrative embodiments of the present invention, the pulse train is a periodic waveform comprising instantaneous transition between the high voltage level pulse and the low voltage level portion.

In accordance with aspects of illustrative embodiments of the present invention, the pulse train has a configurable frequency.

In accordance with aspects of illustrative embodiments of the present invention, the bus scan cycles comprise dual scan bus cycles having alternating A and B scan cycles where each A scan cycle and each B scan cycle comprises the selected number of I/O channels and that synchronization pulse.

In accordance with aspects of illustrative embodiments of the present invention, the pulse train is an offset square wave with configurable frequency, and comprises a selected number of cycles that are assigned to a corresponding number of the I/O channels and that are generated by the control unit. For example, the selected number of I/O channels is configured in the control unit.

Illustrative embodiments and respective aspects thereof can be used with other illustrative embodiments.

Additional and/or other aspects and advantages of the present invention will be set forth in the description that follows, or will be apparent from the description, or may be learned by practice of the invention. The present invention may comprise an I/O and control system and data communication bus protocol and methods for forming and operating same having one or more of the above aspects, and/or one or more of the features and combinations thereof. The present invention may comprise one or more of the features and/or combinations of the above aspects as recited, for example, in the attached claims.

BRIEF DESCRIPTION OF THE DRAWINGS

The present invention will be more readily understood with reference to the illustrative embodiments thereof as shown in the attached drawing figures, in which:

FIG. 6B is a table providing scan cycle states and corresponding values for the pulse train of FIG. 6A.

Throughout the drawing figures, like reference numbers will be understood to refer to like elements, features and structures.

DETAILED DESCRIPTION OF ILLUSTRATIVE EMBODIMENTS

Figure 1:
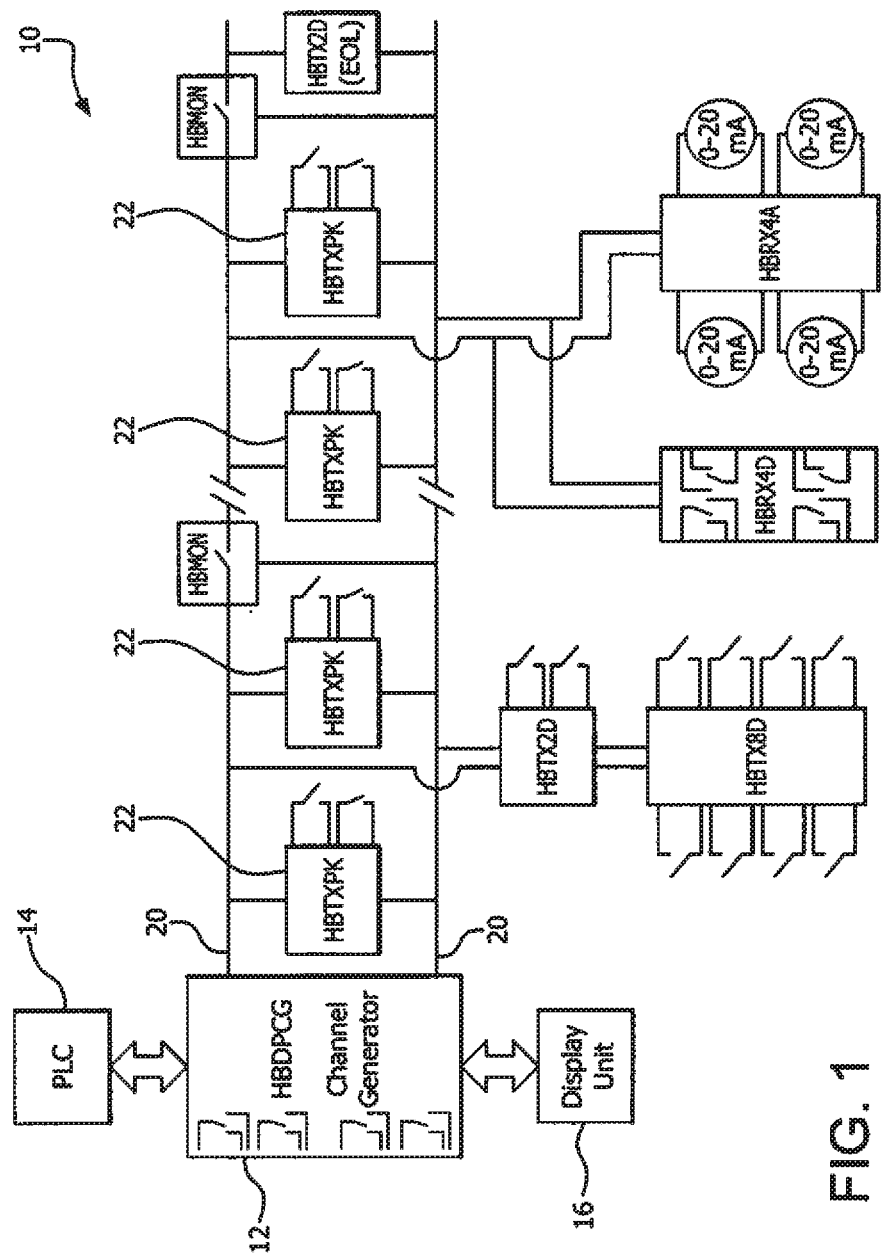
FIG. 1 is a block diagram of an input/output (I/O) and control system employing a data communication bus protocol in accordance with an embodiment of the present invention.

Reference will now be made in detail to embodiments of the present invention, which are illustrated in the accompanying drawings. The embodiments described herein exemplify, but do not limit, the present invention by referring to the drawings. As will be understood by one skilled in the art, terms such as up, down, bottom, and top are relative, and are employed to aid illustration, but are not limiting.

The following definitions are provided for reference in connection with the following description of various aspects of illustrative embodiments of the present invention:

ADC: analog to digital converter, channel pulse or window: a cycle comprising low voltage level portion for a designated period of time, and a high voltage level portion for a designated period of time, channel bandwidth: total time allocated to each channel pulse (e.g., default value of 2400 us), channel generator or control unit: a controller module that generates an outbound waveform and receives inbound transmissions, common line: a low voltage (e.g., 0 V) return line, high floor (or high side) value or threshold: an upper current level required for valid inbound signal transmission, inbound: transmission from a line device to the channel generator, low floor (or low side) value or threshold: lower current level required for inbound signal transmission, mark: inbound or outbound transmission within a channel's window, outbound: transmission from the channel generator to line device, pulse pair: two pulses which represent the state of a channel, receiver: a line device that listens for outbound messages, signal line: a high side or voltage line with waveform generated by the channel generator, space: inbound or outbound non-transmission within a channel's window, transmitter: a line device that transmits inbound messages.

With reference to FIG. 1, an I/O and control system 10 is provided in accordance with an illustrative embodiment of the present invention. As described below, the I/O and control system 10 is advantageous because the channel generator supports dual current detection with respect to a two wire bus and a dual inbound detection algorithm to provide a significantly higher level of reliability in detection of inbound transmission on the bus and protection against false detection of inbound transmissions due to noise, among other reasons.

The I/O and control system 10 comprises Programmable Logic Controller (PLC) 14 and a display unit 16, which are shown connected to a control unit or channel generator 12. The PLC 14 and display unit 16 can be connected to the channel generator 12 via Ethernet or RS485 MODBUS, for example. The control unit or channel generator 12 is connected to a plurality of I/O modules via a bus indicated generally at 20. The I/O modules indicated generally at 22 can include, but are not limited to, one or more pull-key transmitters (HBTXPK), network monitor (HBMON), and other types of transmitters such as a two channel digital transmitter (HBTX2D), an eight channel digital transmitter (HBTX8D), a four channel digital receiver (HBRX4D), and four channel analog receiver (HBRX4A). As shown, one of the modules is operated as an end of line (EOL) monitor.

The illustrative I/O and control system 10 can be used for a target industry such as the overland conveyor industry and its associated activities such as stacker reclaimers and port coal loading facilities. The illustrative I/O and control system 10 can be used for other industrial and commercial applications such as car parks (e.g., having parking space sensors for parking space availability tracking), lighting automation, and other systems which employ monitoring by and control of many distributed input and/or output (I/O) devices or modules. The I/O modules are distributed or positioned at locations along a conveyor, for example, or other line or pattern depending on the system 10's industrial or commercial application. The I/O modules are connected to each other and the controller or channel generator 12 by the bus 20.

The bus 20 can be, for example, any cable that allows communication and provides power over long distances. The bus can be a two wire system. For example, the bus can employ twisted pair for improved noise and crosstalk immunity as the cable is a key area for noise immunity. Additional specifications for a cable deployed for the bus 20, for example, can be 2.5 mm$^2$ cores, low capacitance, configured for reduced reflection and propagation delays, and no shield for ease of installation in normal circumstances, but should be provided for worst case scenario.

The I/O and control system 10 can supply sufficient power to supply line powered I/O modules or devices at a minimum 12 VDC from the controller 12, or a supply of 48 VDC to allow for a required number of line powered devices depending on the particular application for which the system 10 is being used. For example, the supply of a larger voltage level (e.g., 48 VDC) at the controller 12 can allow for better power distribution on long cable runs where there may be significant voltage drops on the line. Channel bandwidth can be selected and altered to supply sufficient power to I/O modules or devices connected via the bus and deployed along a conveyor or other line or pattern depending on the system 10's industrial or commercial application.

Due to the longer conveyor or commercial or industrial line lengths needed, a larger number of I/O modules or devices are also needed. The illustrative I/O and control system 10 can be configured, for example, to meet a minimum transmission distance of 16 km. Further, the I/O and control system 10 can be configured to operate a minimum of 512 I/O channels and to power a minimum of 320 transmitters from the bus 20, for example, which represents significant improvements and advantages over SILBUS and other existing I/O and control systems. In addition, the I/O and control system 10 is scalable, that is, it can be configured to increase the number of channels with a decrease in refresh rates and vice-versa via the controller 12. Further, all of the I/O modules are automatically self-configuring for channel bandwidth and number of channels.

Figure 2:
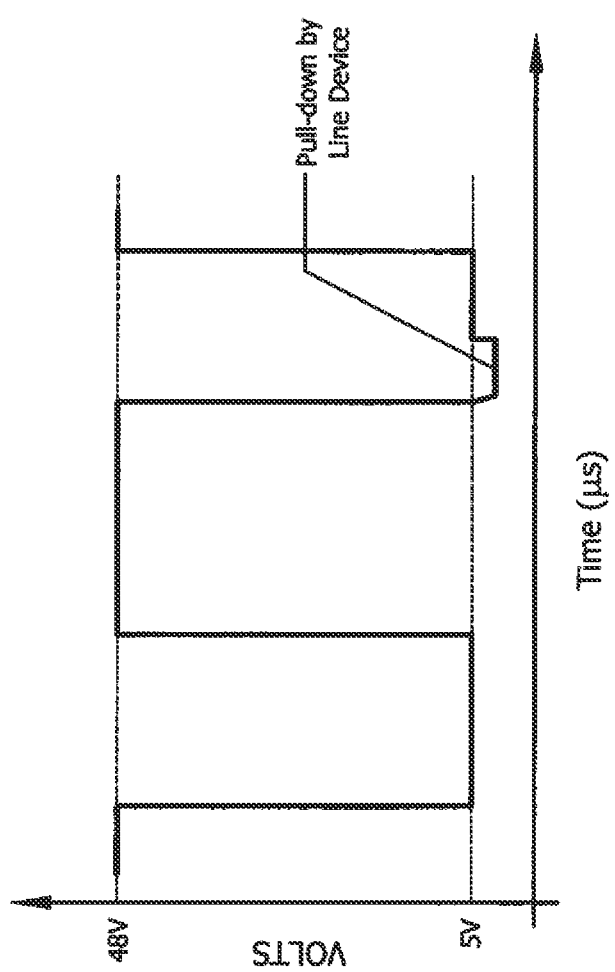
FIG. 2 is a diagram illustrating bus signal voltage levels of an example physical layer of the I/O and control system in accordance with an embodiment of the present invention.

The physical layer of the I/O and control system 10 will now be described with reference to FIG. 2 and in accordance with an illustrative embodiment of the present invention. To maximize the distance covered by the system 10, the high voltage level is 48 VDC, for example. The voltage level at the low level shall be 5 VDC, for example. Additionally, for example, no line devices (e.g., I/O modules) draw off the line at 9 VDC or lower. When producing the low level supply voltage, the controller 12 passes the voltage through a current sensing circuit. Any devices that need to drive data in its assigned channel during the low voltage period can pull-down on the signal line to the common line on the bus 20. Since there is no load on the low voltage level (5 VDC), its output should remain near that level for the length of the line. The high level voltage side allows for large voltage drops in the bus signal and devices on the bus should remain operational down to 12 VDC. The use of inbound current sensing devices in the channel generator 12 provides significantly increased levels of EMC protection over the voltage load and edge sensing techniques used in SILBUS. A minimum of 2A at 48 VDC is generally available from the channel generator or controller 12.

Figure 3:
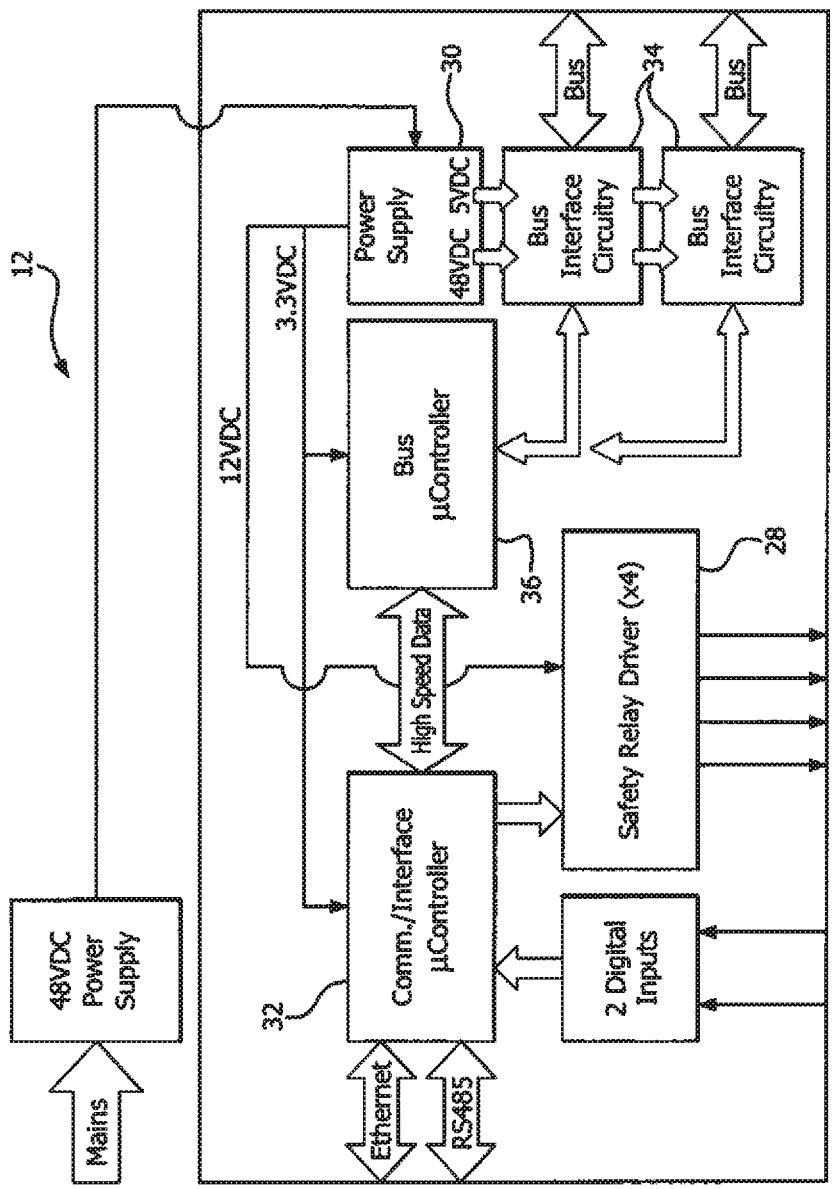
FIG. 3 is a block diagram of a control unit employed in the I/O and control system in accordance with an embodiment of the present invention.
Figure 4:
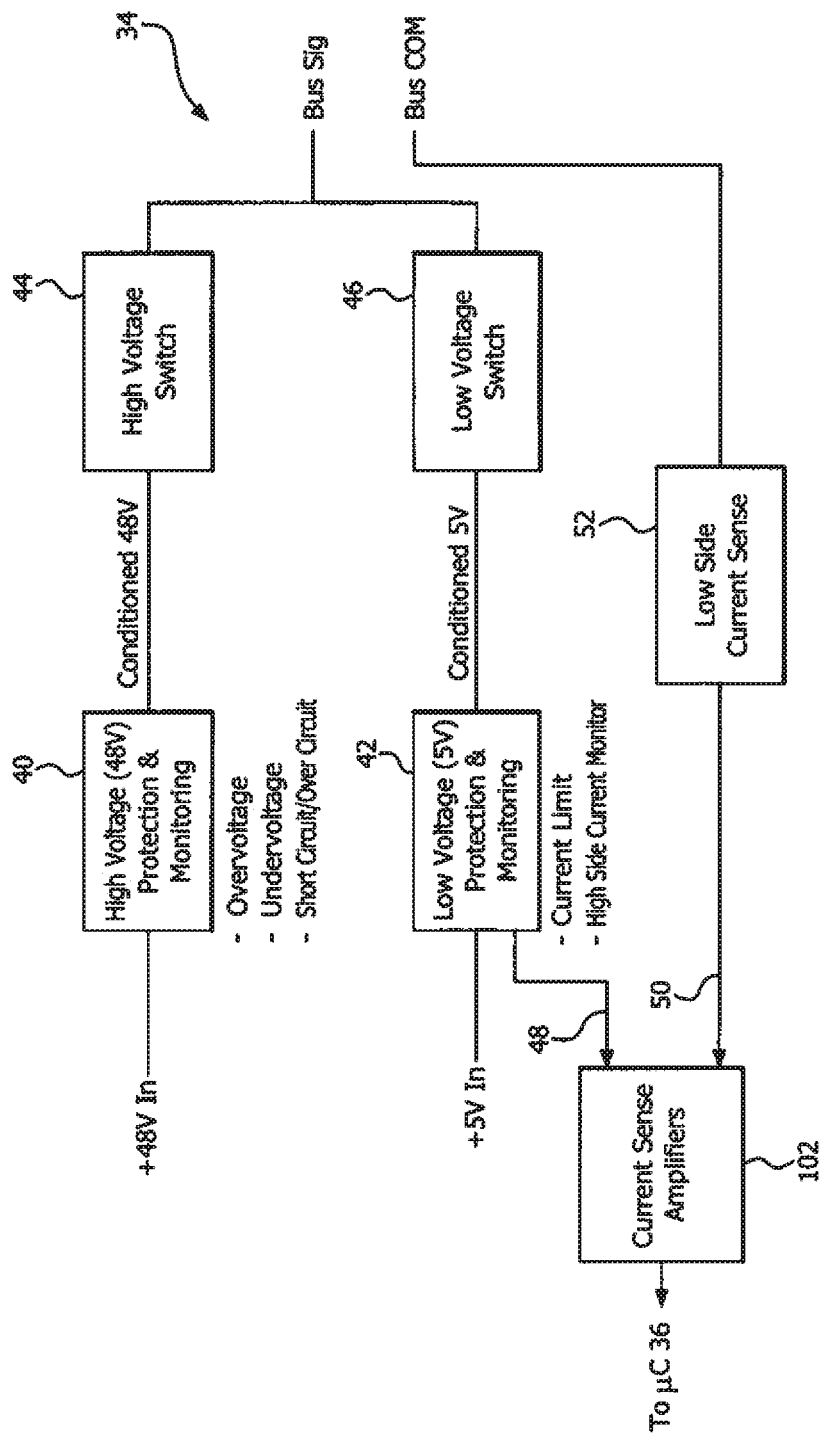
FIG. 4 is a block diagram of bus interface circuitry employed in the control unit of FIG. 3 and constructed in accordance with an embodiment of the present invention.

With reference to FIGS. 3 and 4, an example of a dual port controller or channel generator 12 is provided which generates the bus signal, senses incoming transmissions from line devices 22 on the bus 20, and interfaces to the outside world (e.g., via an Ethernet or RS485 interface). A 48 VDC power source is connected to a power supply 30 in the channel generator 12 that, in turn, provides operating voltages such as 12 VDC for a relay driver 28 and 3.3 VDC for other electronic components such as a microcontroller 36, one or more bus interface circuits 34, and a communications interface 32. The channel generator 12 has channel logic decoding which in turn may be used to drive relays for controlling or signaling external devices. The channel generator 12 can have LEDs (not shown) for indicating health of the controller, power source and/or bus 20, Ethernet activity, and local digital input.

FIG. 4 is a block diagram of a channel generator bus interface 34 in accordance with an illustrative embodiment of the present invention. High (48V) and low (5V) voltage protection and monitoring modules 40 and 42 provide conditioned high and low voltage signals to respective high and low voltage switches 44 and 46 to drive the outbound bus signal in accordance with a protocol as described in more detail below. High side and low side current signals 48 and 50 carry incoming or inbound transmissions from line devices on the bus 20 that are detected via the current sense circuits 42 and 52.

Figure 5A:
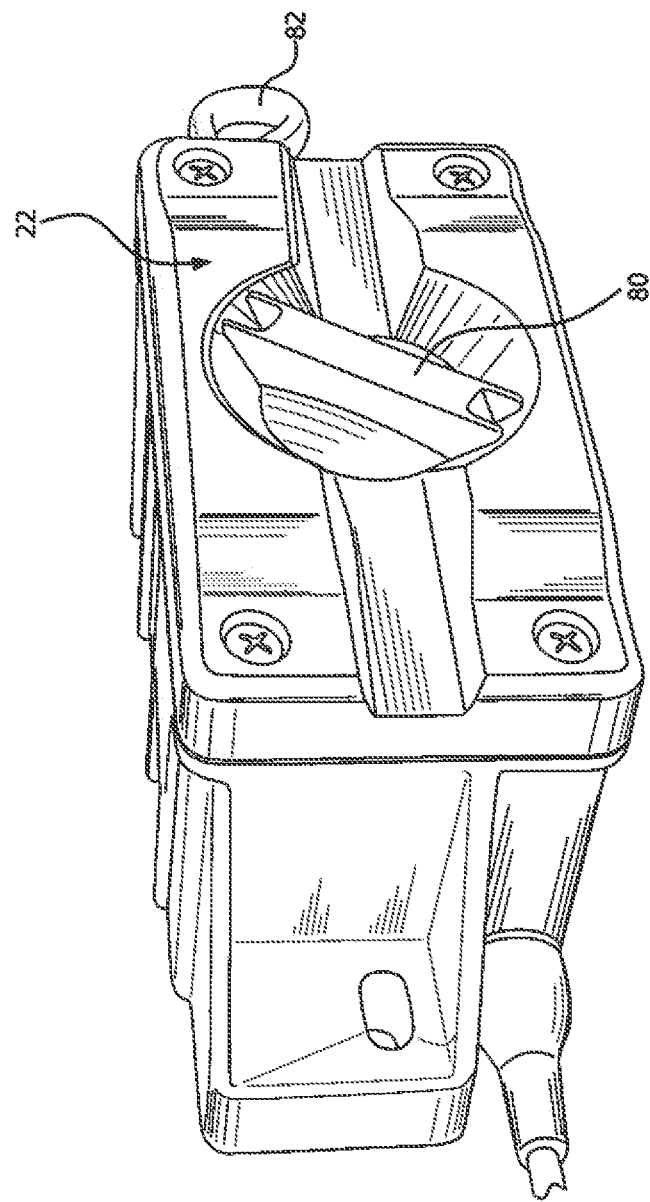
FIGS. 5A and 5B illustrate, respectively a perspective exterior view and a block diagram of an example field device in the I/O and control system in accordance with an embodiment of the present invention such as a pull key housing in which a transmitter is deployed.
Figure 5B:
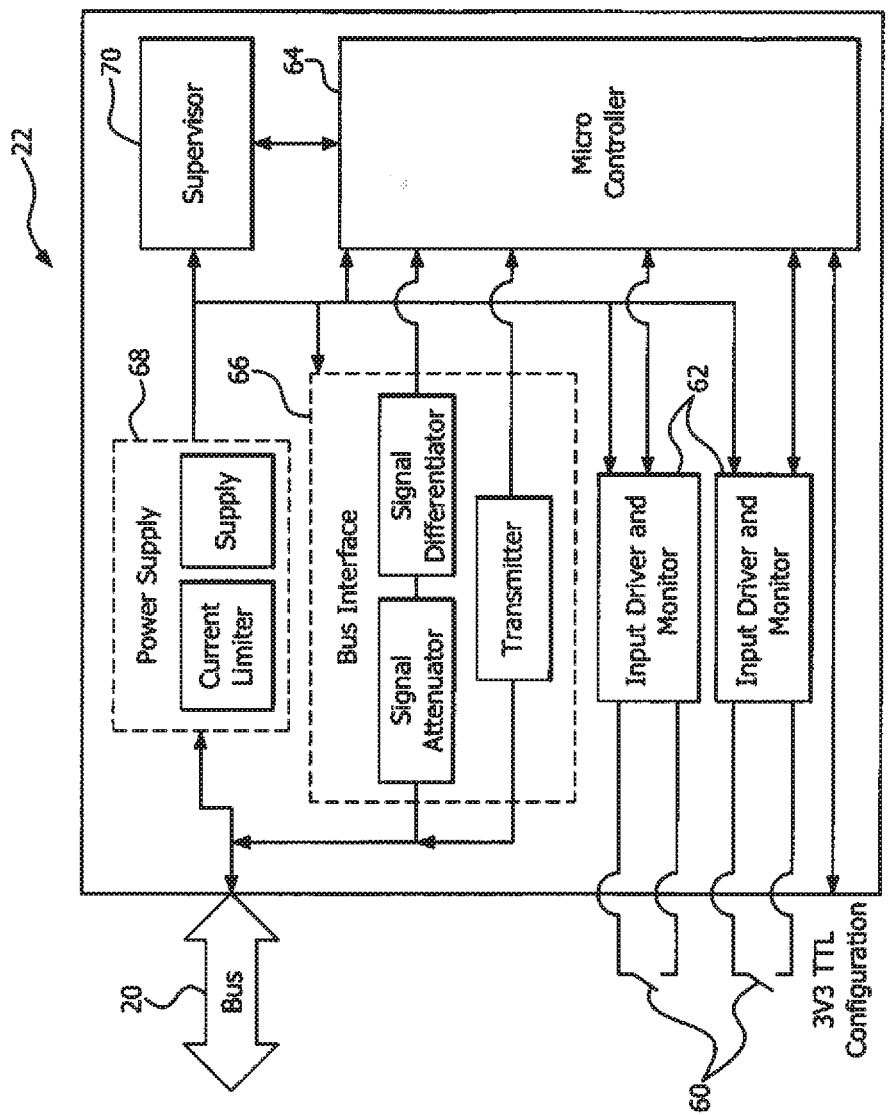

FIGS. 5A and 5B depict, respectively, a pull-key transmitter (HBTXPK) 22 as an example I/O module or line device 22 constructed in accordance with an illustrative embodiment of the present invention. With reference to FIG. 5A, the two-input transmitter 22 is fitted into a pull-key (or cable-pull limit switch) assembly. The pull key is used to provide controlled stop functions for distributed plant or conveyors. The pull key can be operated using the front centrally located knob 80 or each of the two side located flexible cable-pull actuators 82. The side cable-pull actuators 82 can be used in tensioned and non-tensioned systems.

With reference to FIG. 5B, the transmitter 22 has two inputs 62 driven by voltage free contacts 60. One contact 60 is Normally Open (NO) and the other contact 60 is Normally Closed (NC). It is expected that the change-over of contacts occurs at the same time and only a single output channel is required. If both inputs are in the same state, a fault condition is considered to exist. The microcontroller 64 and bus interface 66 process the inputs 62 for transmission on the bus 20. A power supply 68 receives power (e.g., a low voltage signal) from the bus to provide power to the components of the transmitter 22. A supervisory circuit 70 can be provided to monitory health of the transmitter such as power level.

By way of another I/O module or line device 22 example, a two digital input transmitter (HBTX2D) is like the pull-key transmitter (HBTXPK). Transmitter has two inputs 62 driven by voltage free contacts 60. Rather than a single output with dual input with redundancy, the dual input transmitter outputs two separate states on different channels. An eight digital input transmitter (HBTX8D) has inputs driven by voltage free contacts. States output on 8 separate I/O channels on the bus 20. The eight-channel digital transmitter is a small line powered transmitter capable of transmitting the status of eight voltage free contacts and can be used for sensing the status of remote voltage free contacts such as emergency stop, pull key, belt wander, belt rip and blocked chute switches on long conveyors to name but a few. The transmitter can be line powered from the two-wire bus 20 network cable, thereby reducing installation and cabling costs.

Additional examples of I/O modules 22 include, but are not limited to, a four channel analog transmitter (HBTX4A) with 0-2 VDC or 0-20 mA input. Any offsets such as 0.4V or 4 mA will not be removed but rather transmitted. Data (e.g., 12 bits+4 CRC bits) is transferred via the datalink protocol over the configured number of channels. A four channel analog receiver (HBRX4A) has 0-2 VDC or 0-20 mA output. Data (e.g., 12 bits+4 CRC bits) is transferred via the datalink protocol over the configured number of channels.

Another example I/O module 22 is a four channel receiver (HBRX4D) with digital (relay) outputs. The HBRX4D can receive from just a few through to many digital ON/OFF signals from the control system 10 bus network to control the four relay outputs directly or via complex multi-term logic functions. The digital receiver has four output relays controlled by up to six logic resolvers (4 physical linked to a relay and 2 virtual may be used to drive a channel) capable of implementing OR, AND, NOR, NAND and FLIP logic functions. Each resolver has an independently configurable output ON and OFF delay filter to allow implementation of simple timer functions. Further, a dual channel temperature transmitter (HBTX2T) has a temperature input designed to work with a standard two, three or four wire PT100 temperature sensor. The temperature transmitter can be configured to operate on one of two temperature ranges, −10° C. to +100° C. or −20° C. to +200° C., which makes the module particularly suited to monitoring bearing or similar plant temperatures via the bus 20 network without any requirements for additional power. A network monitor reports back to the channel generator and control unit 12 various network and line parameters such as, but not limited to, line voltage, slew rate, reflection, and ground leakage. The monitor (HBMON) may also be used to isolate downstream parts of the network to help with fault isolation.

The applications of the I/O modules (e.g., transmitters and receivers) are not limited to conveyor installations, but can be used in any application where the status of a remote switch contact or relay contact is required to be monitored, for example.

The data layer of the I/O and control system 10 will now be described in accordance with an illustrative embodiment of the present invention. The basis of data transmission along the bus 20 is pulse width modulation (PWM) for outbound communications (e.g., from control unit 12 to line devices such as the pull key transmitter (HBTXPK)) and current detection for inbound communications (e.g., from line devices or I/O modules to the control unit or channel generator 12). The channel generator continuously maintains an offset square wave of a configurable frequency, wherein each of plural channel windows or pulses comprises a low voltage portion and a high voltage portion. A channel window or pulse can be used to represent one I/O channel described below. Alternatively, a designated plural number (e.g., 2 or more) of channel windows or pulses can be used to represent one I/O channel. The number of channel windows and therefore the number of channels can be configured in the channel generator. The typical number of channels is 64, 128, 256 or 512 (with 1024 and 2048 available for large systems).

The I/O and control system 10 is a distributed I/O system such that not all communications are from the field devices 22 to the control unit 12 or vice versa. For example, communications can be from field device 22 to field device 22. The I/O and control system 10 couples the inbound to the outbound communications, allowing multiple receivers (e.g., among the field devices 22 and control unit 12) to sample or eavesdrop on a single transmitter device, thus providing true distributed I/O. Coupling is achieved upon the channel generator sampling the inbound current detection and immediately altering the outbound pulse width modulation to reflect the state of the inbound channel. In some applications, the inbound and outbound communication can be un-coupled and is referred to split I/O.

Figure 6A:
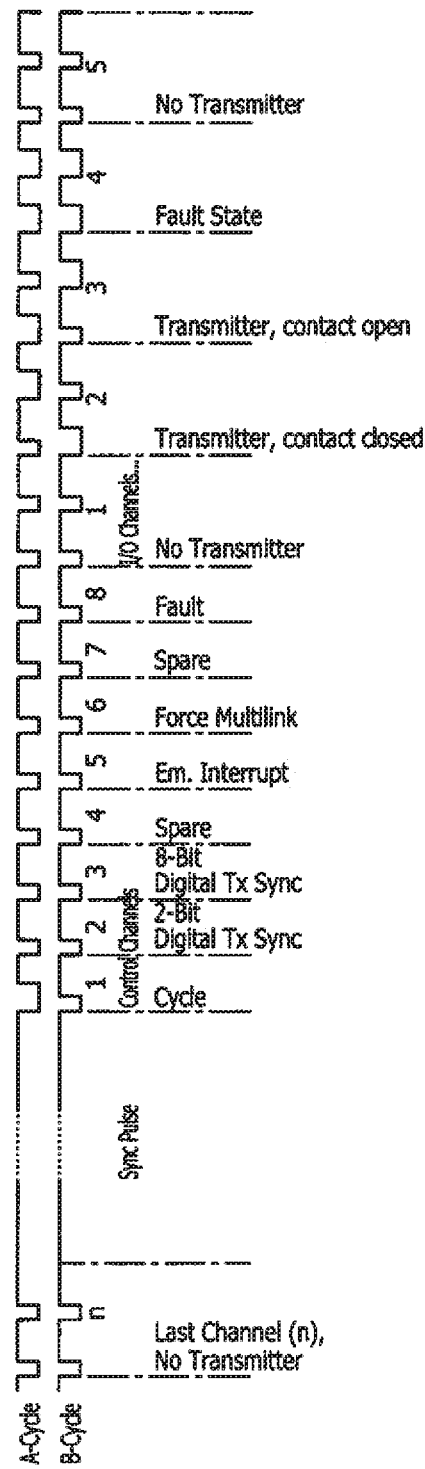
FIG. 6A is a diagram of a pulse train employed in a data communication bus protocol in accordance with an embodiment of the present invention.

Example inbound and outbound channels in a pulse train on the bus 20 will now be described with reference to FIGS. 6A, 6B, 7A, 7B, 8A and 8B. FIG. 6A depicts a complete scan of the bus 20 which consists of, for example, two complete cycles of a pulse train (hereinafter referred to as cycle A and cycle B). A pulse train can comprise, for example:

A synchronization pulse (hereinafter sync pulse);
Eight (8) control channels; and
64×n I/O channels were n=1 . . . 32 (i.e. 64 to 2048 I/O channels). As will be described below in connection with FIGS. 6A and 6B, each I/O channel toggles its inbound and outbound state on alternating cycles, allowing for unit detection (and removal detection) and providing improved noise immunity of false triggers.

By way of an example, the control channels can comprise 8 system control bits (e.g., Bits 1 through 8) wherein Bit 1 is a cycle sync indicator that is set to indicate whether the current pulse train is an A scan cycle or a B scan cycle. One or more designated system control bits can be unassigned to allow for future system configuration or control settings. For example, Bits 4 and 7 can be spare bits that can be assigned a system control function at a later date. The outgoing bits for Bits 4 and 7 are set as spaces for all cycles. The inbound bits for Bits 4 and 7 are not set by any line module 22. A Bit 5 can be designated as an emergency interrupt mode enabled indicator. In other words, if this bit is set by the channel generator 12, then a special priority interrupt mode is enabled for transmitters to indicate an emergency situation. If the priority interrupt feature is enabled, then Bit 5 is set in both of the A and B scan cycles. Bit 6 is a force multilink mode indicator for system diagnostic purposes, for example. Information can be requested from specific registers in this mode such as, for example, device 22 type, serial number, device status, and so on. If Bit 6 is set, then any safety functions automatically go to the safe state. Bit 6 can be used to force channels 1 to 16 to a multilink mode for all devices 22 programmed on these addresses such that these devices 22 will not transmit unless specifically addressed in a multilink protocol, as will any other device 22 addressed by the multilink protocol. Bits 2 and 3 can be a digital transmission sync bits that mark the beginning of, for example, a 12 bit data+4 bit CRC digital transmission where Bit 2 indicates a 2 bit per cycle transmission, Bit 3 indicates an 8 bits per cycle transmission and the combination of both Bits 2 and 3 indicate the transmission of 16 bits per cycle and are thus set as a mark state on the $8^{th}$, $2^{nd}$ or every pulse train cycle respectively. Bit 8 can be a fault bit such that, in the event of a system fault being detected by the channel generator 12, the outgoing fault bit is set as a mark to indicate the fault condition to the rest of the system 10. Likewise, if a major system fault is detected by one of the modules 22 (e.g., such as a failure of a safety function), the incoming fault bit is set as a mark and the channel generator 12 in turn sets the outgoing bit. Each individual I/O module can also indicate a failed state by driving both cycles of the scan with a mark on the incoming channel. It is understood that different types of, and more or less number of, control channels or control bits can be used in a pulse train scan cycle A or B.

Figure 7A:
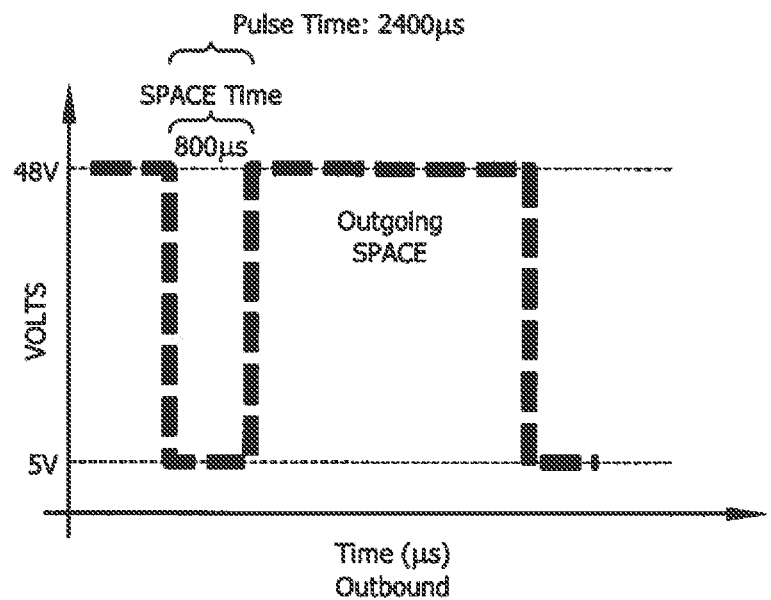
FIGS. 7A and 7B are signal diagrams illustrating outbound channel pulse timing of a data communication bus protocol in accordance with an embodiment of the present invention.
Figure 7B:
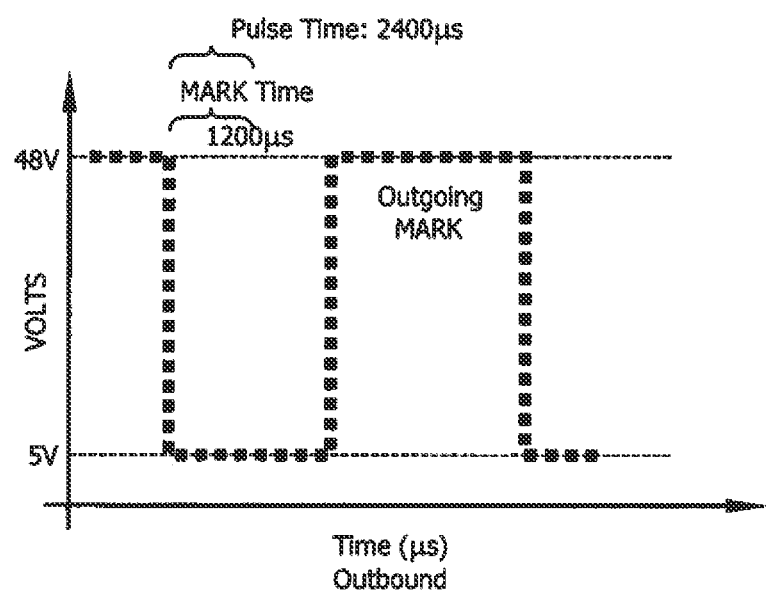

FIGS. 7A and 7B depict illustrative outbound pulse timing. For example, at the start of a channel, the signal drops from the high voltage level to the low voltage level. A 'space' is 800 μs (e.g., or ⅓ of the channel bandwidth) of low voltage level before returning to the high voltage level for the remaining time of the channel's bandwidth of 1600 μs. A 'mark' is 1200 μs (e.g., or ½ of the channel bandwidth) of low voltage level before returning to the high voltage level for the remaining time of the channel's bandwidth of 1200 μs (e.g., or ½ of the channel bandwidth again).

Figure 8A:
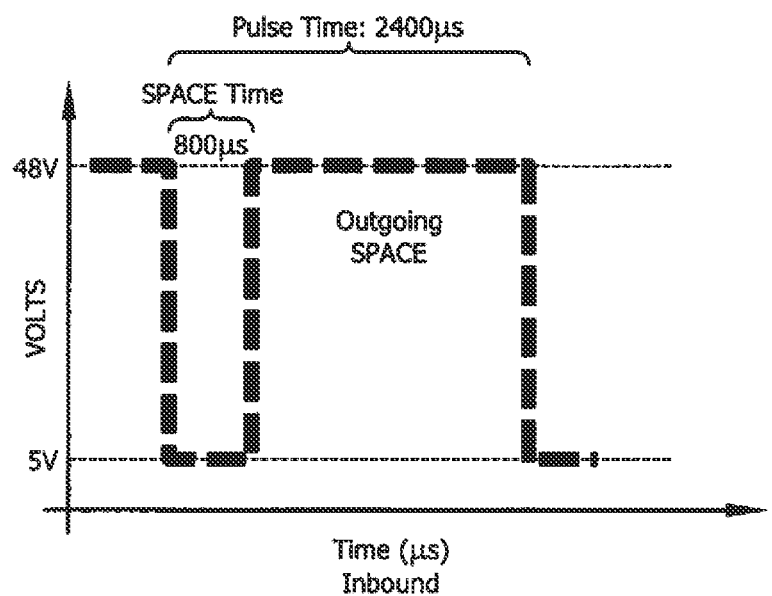
FIGS. 8A and 8B are signal diagrams illustrating inbound channel pulse timing of a data communication bus protocol in accordance with an embodiment of the present invention.
Figure 8B:
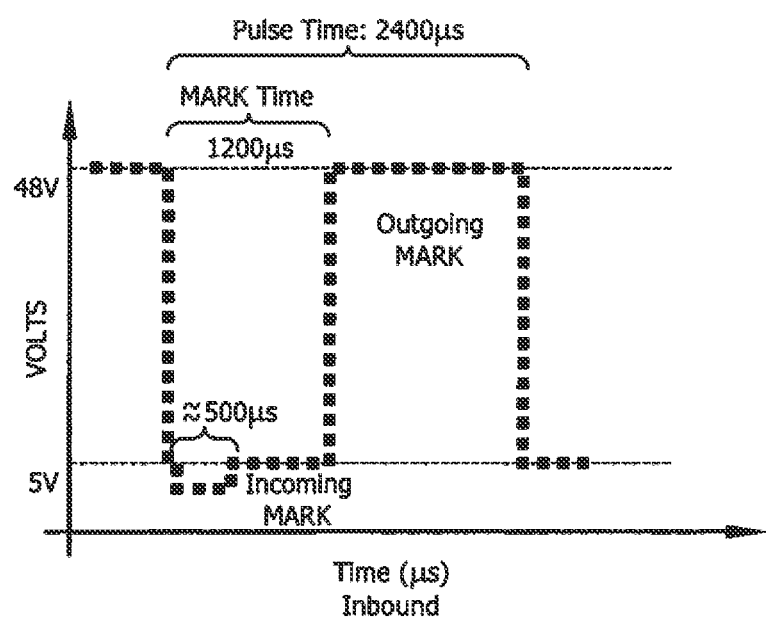

FIGS. 8A and 8B depict illustrative inbound pulse timing. A transmitter (e.g., in a device 22) which has detected its channel in a pulse train cycle can either pull-down on the bus 20 or it can be passive. The pull down is made during the first 500 µs and is detected by the channel generator 12 via current measurement. For normal I/O channels, once a valid pull down has been detected, the channel generator 12 will delay the rising edge of the channel pulse by an additional 400 µs (e.g., or ⅙ of the pulse bandwidth). It is this additional delay to the rising edge of the pulse that other appropriately coded receivers (e.g., in devices 22) detect and act upon. Because the pulse train and modulation is present along the entire length of the bus 20, receivers may be placed at any convenient point along the bus to monitor a channel for local output. In fact, many receivers may monitor the same channel or transmitter.

With reference to FIG. 6A and the table in FIG. 6B, each I/O channel toggles its inbound and outbound pulse-pair state on alternating cycles, allowing for unit detection (and removal detection), detection of stuck transmitters and providing improved noise immunity of false triggers. For example, each pulse train's I/O channels pulse-pair carry 1 bit of inbound and outbound data. If an inbound pulse is set, then the channel generator 12 sets the outbound state for that pulse. The channel generator may also set the outbound state independent of the inbound state. In normal operation, the channel states in the A-pulse train or A-cycle and in the B-pulse train or B-cycle are inverted states. In other words, if the inbound and outbound state of channel 2 is "ON" in the A-pulse train with a space-mark pulse pair, then it has a mark-space pulse-pair in the B-pulse train. Likewise, if the inbound and outbound state of channel 3 is "OFF" in the A-pulse train with a mark-space pulse pair then it has a space-mark pulse-pair in the B-pulse train. The exceptions to this are (1) a transmitter missing or having failed and then the channel pulse-pair in both pulse trains is a 'space'; (2) a transmitter indicating fault condition and then the channel pulse-pair in both pulse trains is a 'mark'; and (3) channels carrying data which transmit 2-bits of data (of a 12 bit value plus 4 bit CRC) consecutively each pulse train cycle.

With continued reference to FIG. 6A, a complete scan of the bus 20 consists of two complete cycles of the pulse train (e.g., cycle A and cycle B). For illustrative purposes in FIG. 6A, channel 3 is shown transmitting an 'OFF' state, channel 2 is shown transmitting an 'ON' state, channel 4 is transmitting a fault state and there are no other devices present on other channels. Pulse train A has:
  a sync pulse;
  8 control channels (1st control channel is a 'mark' to indicate cycle A); and
  a number of I/O channels which each consist of a pair of pulses.
  Channel 3 is transmitting an 'OFF' state so it has a mark-space pulse-pair in the A cycle.
  Channel 2 is transmitting an 'ON' state so it has a space-mark pulse-pair in the A cycle.
  Channel 4 is transmitting a FAULT state so it has a mark-mark pulse-pair in the A cycle.
  All other channels have transmitters off.
Pulse train B has:
  a sync pulse;
  8 control channels (1st control channel is a 'space' to indicate cycle B); and
  a number of I/O channels which each consist of a pair of pulses.
  Channel 3 is transmitting an 'OFF' state so it has a space-mark pulse-pair in the B cycle.
  Channel 2 is transmitting an 'ON' state so it has a mark-space pulse-pair in the B cycle.
  Channel 4 is transmitting a FAULT state so it has a mark-mark pulse-pair in the B cycle.
  All other channels have transmitters off.

Accordingly, with reference to FIG. 6A and the table in FIG. 6B, each I/O channel toggles its inbound and outbound pulse-pair state on alternating cycles, allowing for unit detection (and removal detection), detection of stuck transmitters and providing improved noise immunity of false triggers The channel generator 12 emits 8 control channels followed by the configured number of I/O channels regardless of whether or not the channels have been assigned to an I/O device. At the end of the control and channel pulses, the channel generator 12 sends an extended (e.g., extra-wide) pulse that resets all of the counters in the field devices 22 back to zero before the pulse train is repeated. The long synchronization pulse is used to ensure that all field devices are kept in synchronization, ensuring that transmitters transmit on the correct channel and receivers sample the pulse train at the correct time. Field devices 22 can simply count the pulses or channels until the count matches their assigned address before transmitting or receiving.

As stated above, most distributed I/O systems use either voltage level or current detection to determine if a remote device is attempting to transmit to the control unit. Although the current detection method is more robust than voltage level detection, it is still susceptible to noise from sources that may induce current on the line, resulting in false positives (e.g., inbound detection when there is no transmission) or false negatives (e.g., inbound transmission that is not detected by the control unit receiver).

In accordance with an illustrative embodiment of the present invention, the system 10 uses the current detection method to detect incoming transmissions to the channel generator 12. In addition, the system 10 monitors both the common line and the signal line of the bus 20 in the two-wire distributed network and is therefore advantageous over a distributed I/O system wherein only one line of a two-wire bus is monitored. Further, in accordance with another aspect of an illustrative embodiment of the present invention, a dual line inbound detection algorithm is provided which has been derived from system 10 testing that compares the outputs of two current detection circuits 84 and 86 described below, and is able to use these outputs and one or more designated thresholds to differentiate between noise and a valid incoming transmission from a field device 22 to the channel generator 12. The combination of dual line inbound current detection circuitry with the dual line inbound detection algorithm provides a significantly higher level of reliability in detection of inbound transmissions and protection against false detection of an inbound transmission due to noise.

Dual Line Inbound Detection Circuitry

Figure 9:
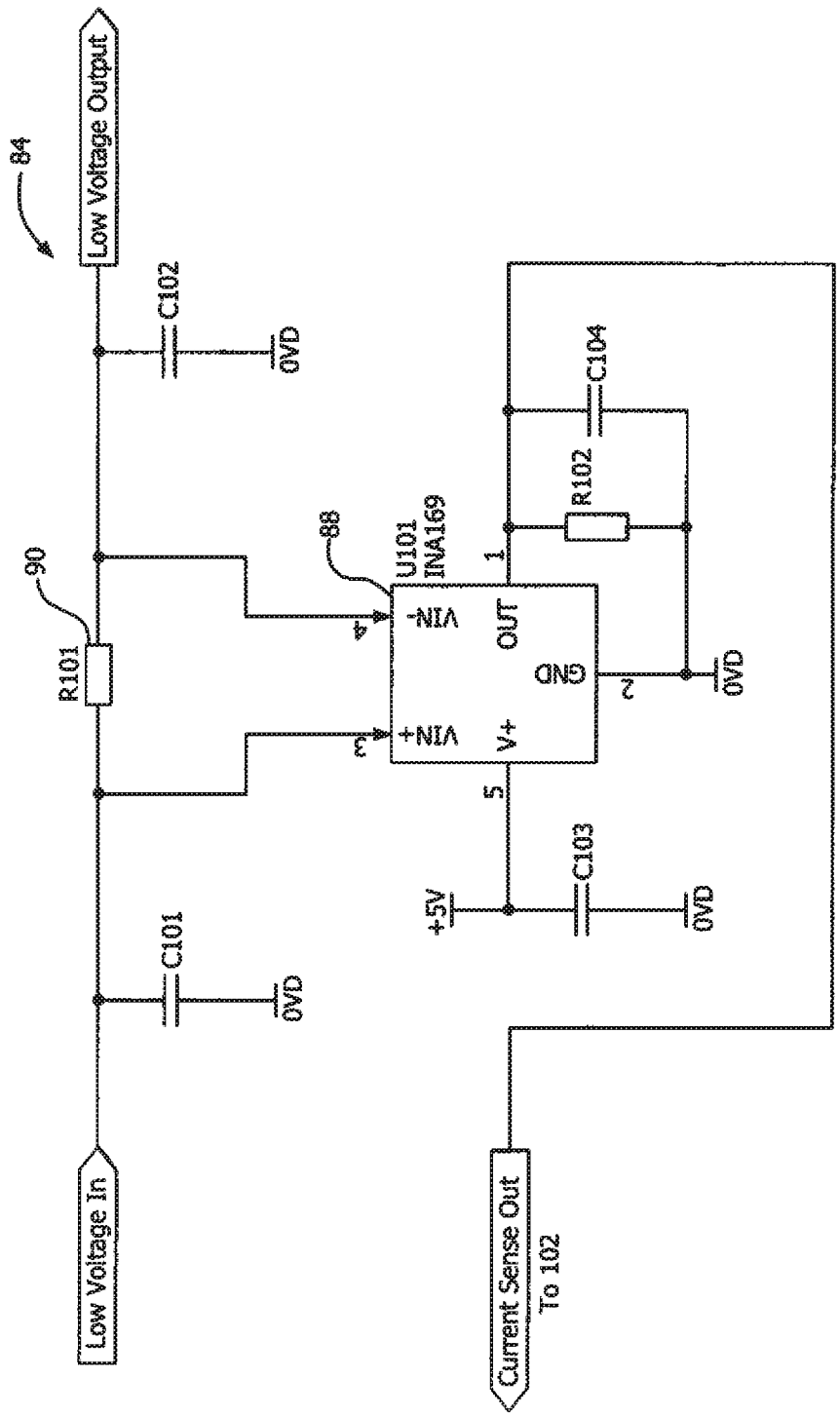
FIGS. 9 and 10 are, respectively, a high side current sense circuit and a low side current sense circuit for use with a channel generator and constructed in accordance with an embodiment of the present invention.
Figure 10:
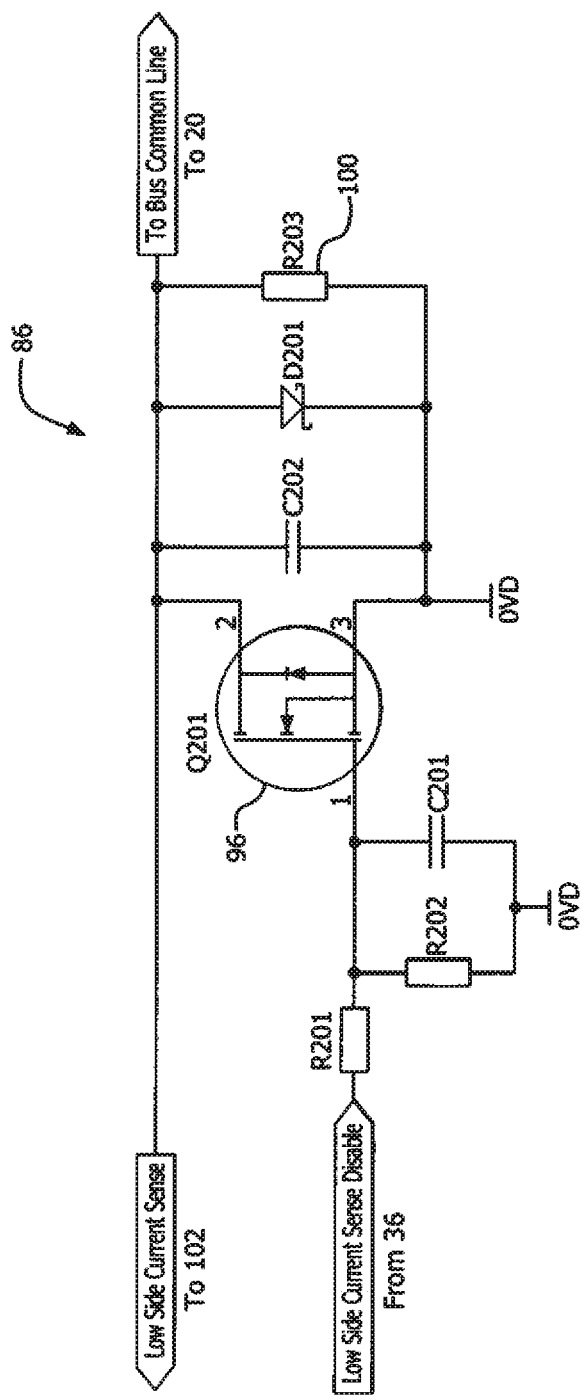

As stated above, the system 10 can employ a pulse width modulated (PWM) waveform where each cycle or channel window has a low voltage level portion and a high voltage pulse as shown for example in FIGS. 8A and 8B. When the system 10 is driven to the low voltage level (e.g., from 48V to 5V such as during the 1200 µs of low voltage level of a mark in a channel of 2400 µs, or at least during the first 500 µs of a channel window with a space during which a pull down could be made to indicate a mark), the current drawn is used to determine the state of the devices in the system. This current is sensed in two separate circuits such as the voltage protection (5V) and monitoring module 42 and the current sense circuit 52 shown in FIG. 4. Illustrative embodiments for implementing current sense circuits 84 and 86 in the voltage protection (5V) and monitoring module 42 and the current sense circuit 52, respectively, are shown in FIGS. 9 and 10. With reference to FIG. 9, an illustrative high side current detector 84 uses a current sensor 88 (e.g., a Texas Instruments INA169 integrated circuit) with a very low value sense resistor 90. The voltage output is low level (10-15 mV) and is fed into the amplifier circuit 102.

With reference to FIG. 10, an illustrative low side current detector 86 is configured to measure the cable 20 return current. Such measurement is only relevant when the bus signal is at the low voltage level, since that is when the measurements are made. Accordingly, a MOSFET 96 is provided to short circuit the sense resistor 100 when the bus signal is at the high voltage level.

Figure 11:
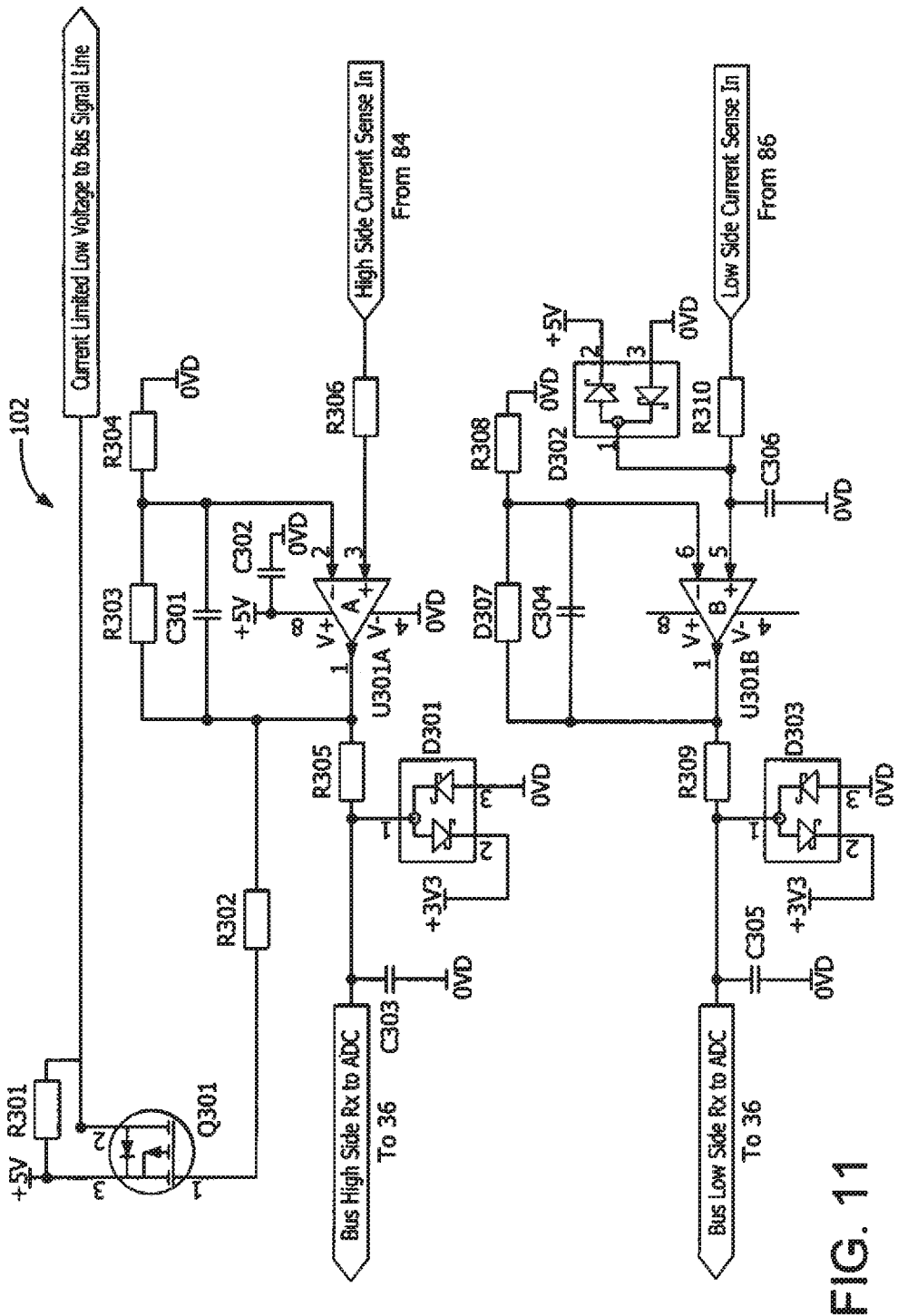
FIG. 11 is a current sense amplifier circuit for use with a high side current sense circuit and a low side current sense circuit associated with a channel generator and constructed in accordance with an embodiment of the present invention.

With reference to FIG. 11, both current detectors 84 and 86 have voltage outputs in the 10-15 mV range. In order for these outputs to be processed by the microcontroller 36, they are amplified by an op-amp circuit 102. A dual op-amp is used (e.g., National Semiconductor LMC6482AIM) with identical circuits for high and low side amplification. The amplifiers output a signal in the 1-3V range for processing by the microcontroller 36. The high side current detector signal is fed into the gate of a P-Channel MOSFET for limiting the current output of the low voltage supply.

Dual Line Inbound Detection Algorithm

To provide the algorithm employed by the microcontroller 36 to monitor the outputs from the current detectors 84 and 86, a significant amount of system testing was performed for modelling purposes using signal generators with various coupling techniques and generation of transient noise pulses by switching of electrical loads in adjacent pairs of wires in the signal cable. The system testing facilitated designation of a high side threshold or detection floor and a low side threshold or detection floor and the efficacy of using both, although a single threshold with high and low side current detection can also work but not likely as reliably.

Figure 12:
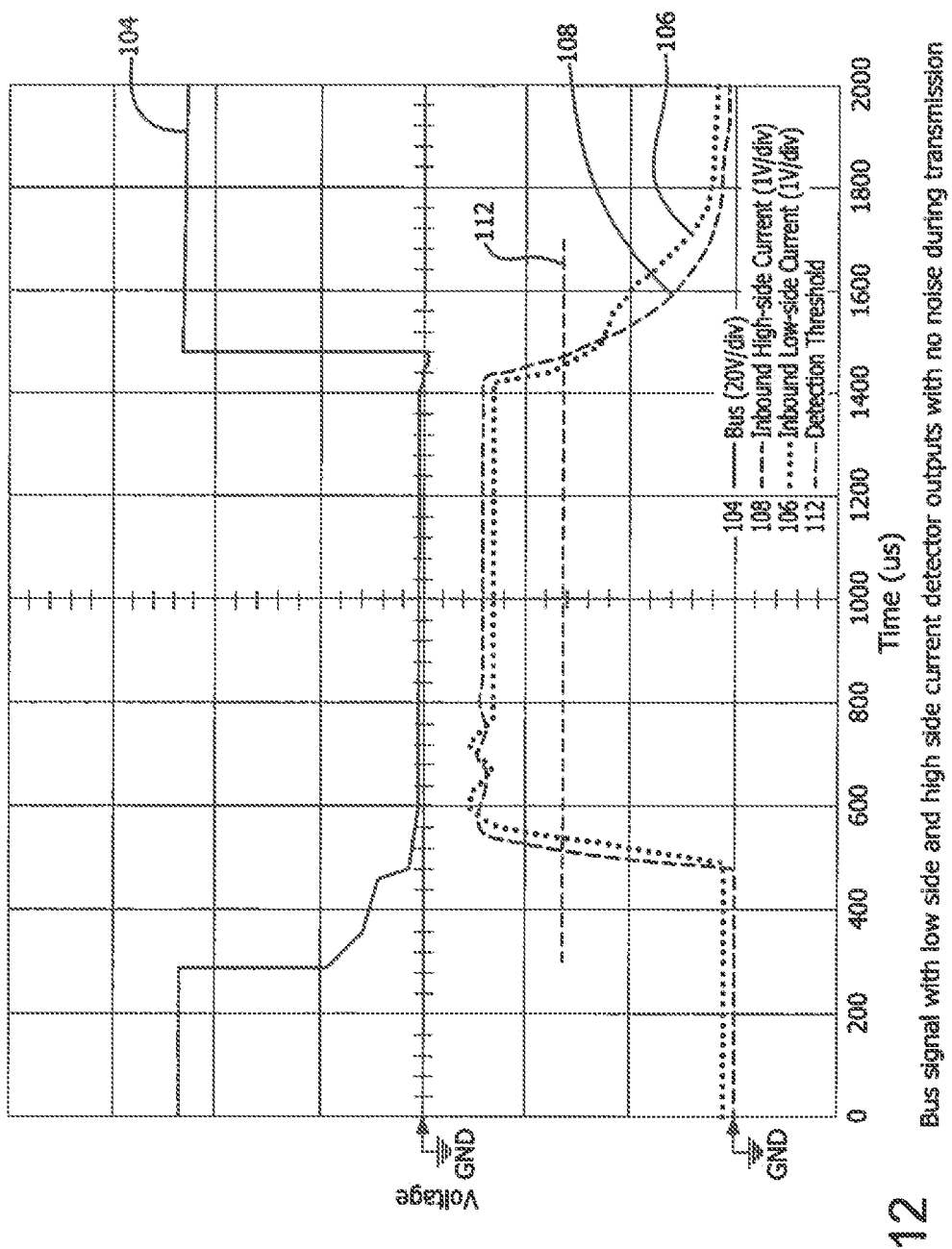
FIG. 12 are waveforms illustrating an example of a data communication bus signal of the I/O and control system, and outputs from the high side current sense circuit and the low side current sense circuit, in the absence of noise interference.

The efficacy of using high and low side detection floors or thresholds versus using a single threshold will now be illustrated in connection with the waveforms in FIGS. 12-17. FIG. 12 is an example waveform capture of the bus signal (104) and the inbound high side current detector output (108) and the low side current detector output (106) with no noise interference. As may be seen in this example ideal situation, a single signal level threshold 112 would be sufficient to determine the inbound status.

Figure 13:
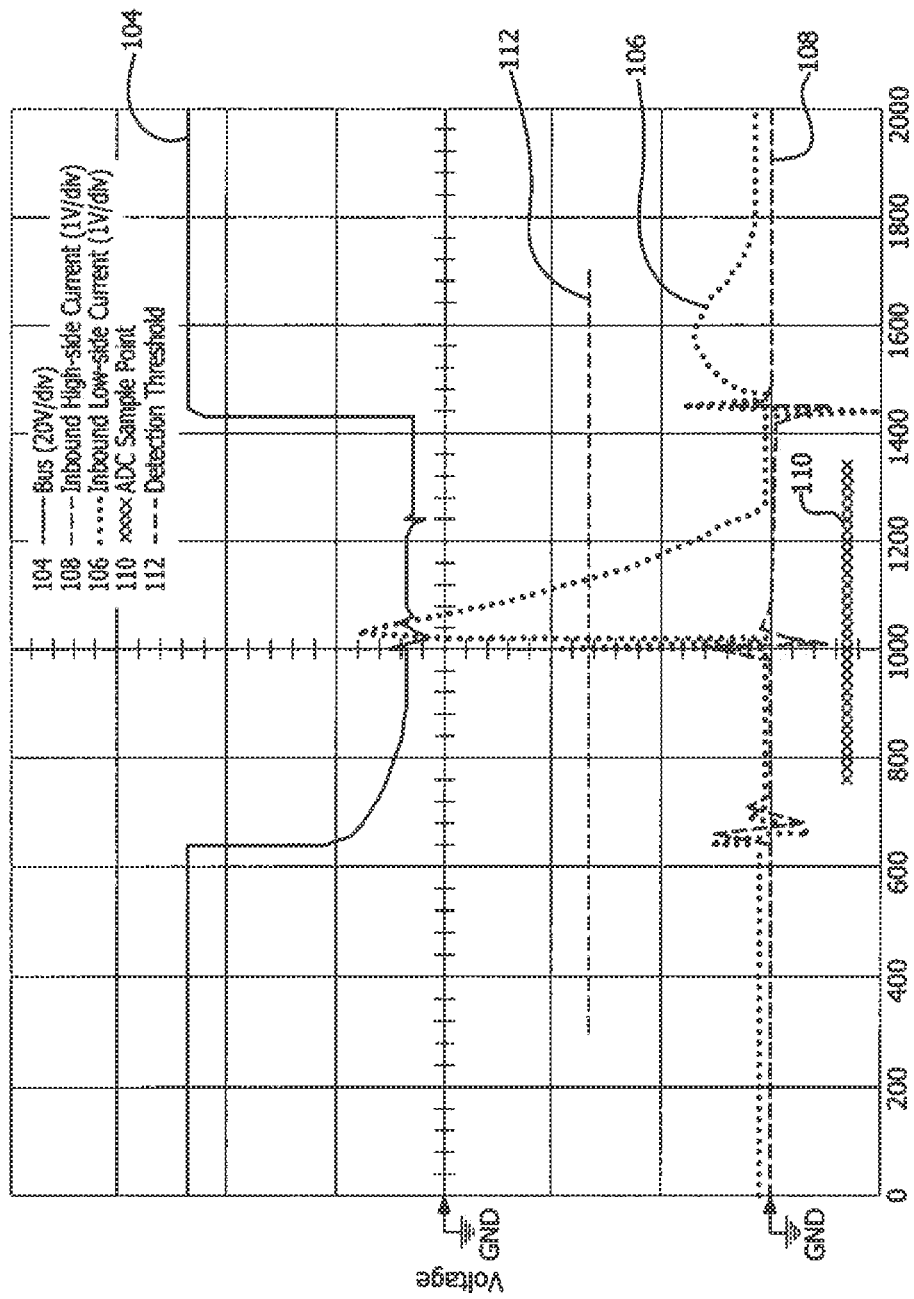
FIG. 13 are waveforms illustrating an example of a data communication bus signal of the I/O and control system, and an output from the low and high side current sense circuits, during no transmission and in the presence of a transient pulse and noise coupled to the data communication bus which manifests on the low side current sense signal.
Figure 14:
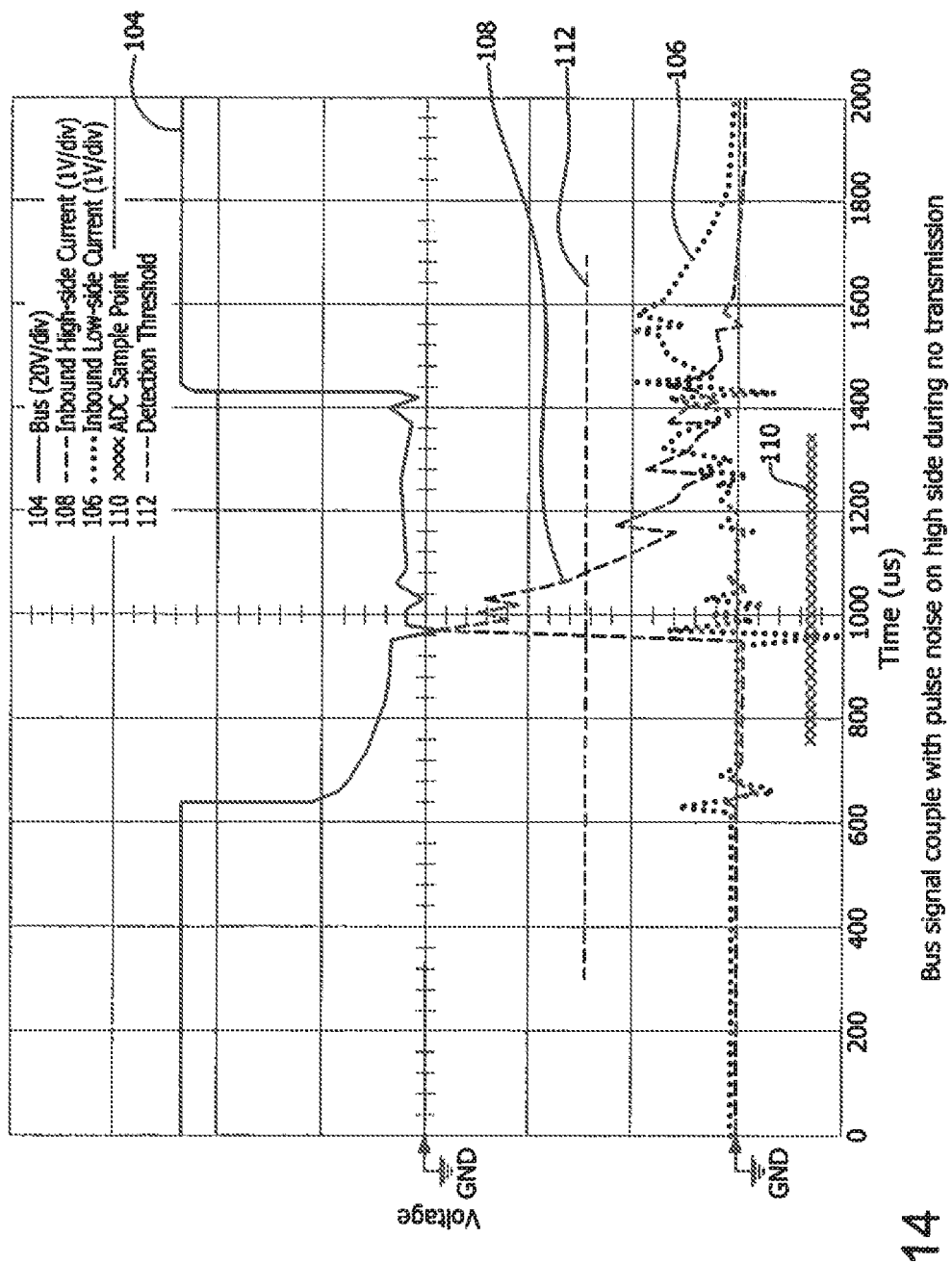
FIG. 14 are waveforms illustrating an example of a data communication bus signal of the I/O and control system, and an output from the low and high side current sense circuits, during no transmission and in the presence of a transient pulse and noise coupled to the data communication bus which manifests on the high side current sense signal.

With reference to FIGS. 13 and 14, it has been determined from the afore-mentioned testing and modelling that coupled noise and transient pulses generally tend to interfere with either the low side (common line) or high side (bus signal) inbound current detection but rarely both. Transient noise, in particular, may generate a pulse that is generally short in duration (e.g., <300 µs) and unlikely to cause a false positive (false mark). A pulse with current in the opposite direction to the inbound current may bring one side (i.e., line) low, resulting in a false negative (e.g., a false space) or, in other words, a failure to detect an incoming pulse. Likewise, coupled noise can generate a negative current resulting in a false negative but only induce a current on a single line during a non-transmitting space which would not be picked up as a transmission.

Figure 15:
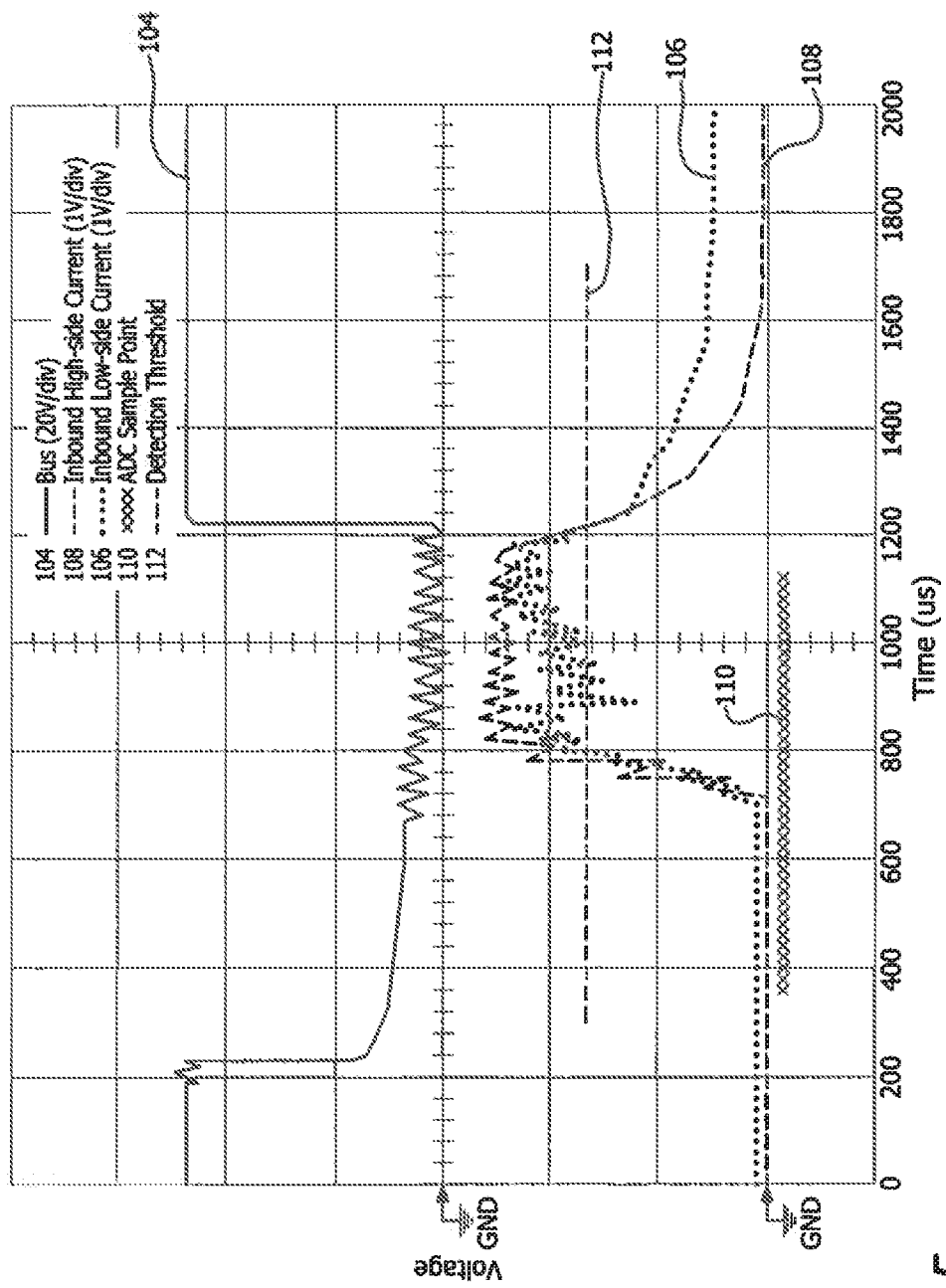
FIG. 15 are waveforms illustrating an example of a data communication bus signal of the I/O and control system, and outputs from the high side current sense circuit and the low side current sense circuit, during transmission and in the presence of noise coupled to the data communication bus, and a single minimum level for valid transmission detection in accordance with an embodiment of the present invention.

FIGS. 12-17 show the effects of a transient pulse on the low side and high side followed by noise coupled to the line from the signal generator. In the FIGS. 12-17, the horizontal cursor line (112) represents an illustrative single detection threshold. FIGS. 13 and 14 illustrate, respectively, a low side current detector pulse and a high side current detector pulse during no transmission. The single detection threshold 112 suffices in FIGS. 13 and 14 since these signals 106 and 108 are not difficult to differentiate. By contrast, however, a single minimum floor level is insufficient to differentiate between valid incoming transmissions and signals affected by noise, as illustrated in FIG. 15. Setting the floor high to overcome noise on the line during non-transmission, however, can cause valid transmissions to be missed if they are affected by noise. Conversely, setting the level too low can result in a signal affected by noise as being considered a valid transmission.

Figure 16:
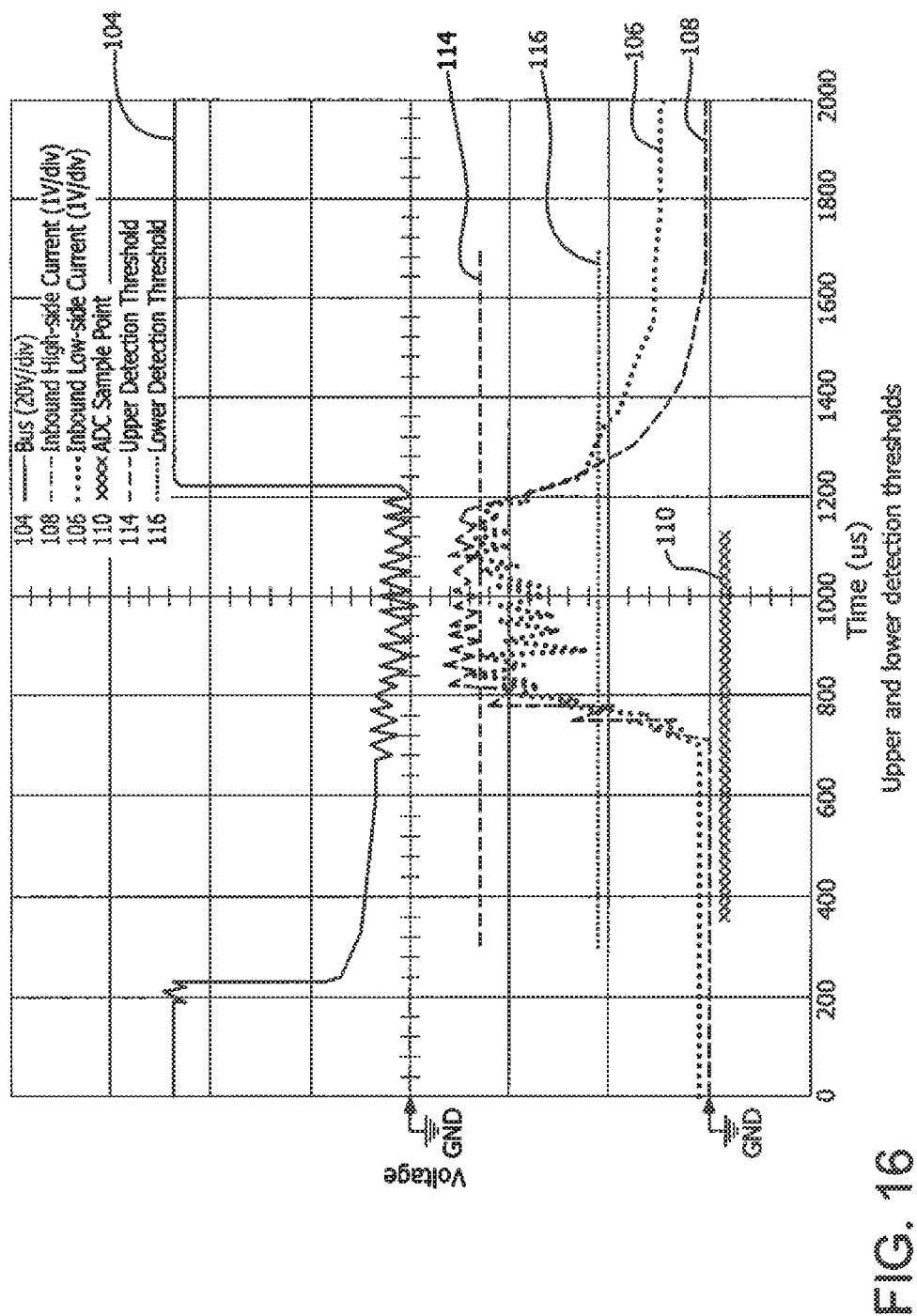
FIG. 16 is similar to FIG. 15 except that upper and lower detection levels for valid transmission detection are used in accordance with an embodiment of the present invention.

In accordance with an illustrative embodiment of the present invention, upper and lower detection floors or thresholds 114 and 116 are designated, as shown in FIG. 16. As determined via the afore-mentioned testing and modelling, generally coupled noise and transient pulses affect one side more than the other. Accordingly, for an inbound signal to be considered valid, then one side should meet an upper (higher) floor level, and the other line may have a reduced floor level which it must meet. These levels are configurable via parameter settings in the channel generator 12. A typical or default value for the upper threshold would be 85% (e.g., percentage of the maximum measurable value at the ADC of the microcontroller 36) and 60% for the lower threshold. Additionally, the number of samples for the moving average described below is set to ten samples for default configurations, for example. Using designated high side and low side detection thresholds or floors eliminates valid inbound transmission being disregarded as noise. Further, invalid signals due to noise are reliably disregarded since as they do not meet both floor levels 114 and 116 simultaneously. FIG. 16 is the same as FIG. 15 but also shows the upper and lower floor levels 114 and 116 which result in correct detection of an inbound transmission.

Figure 17:
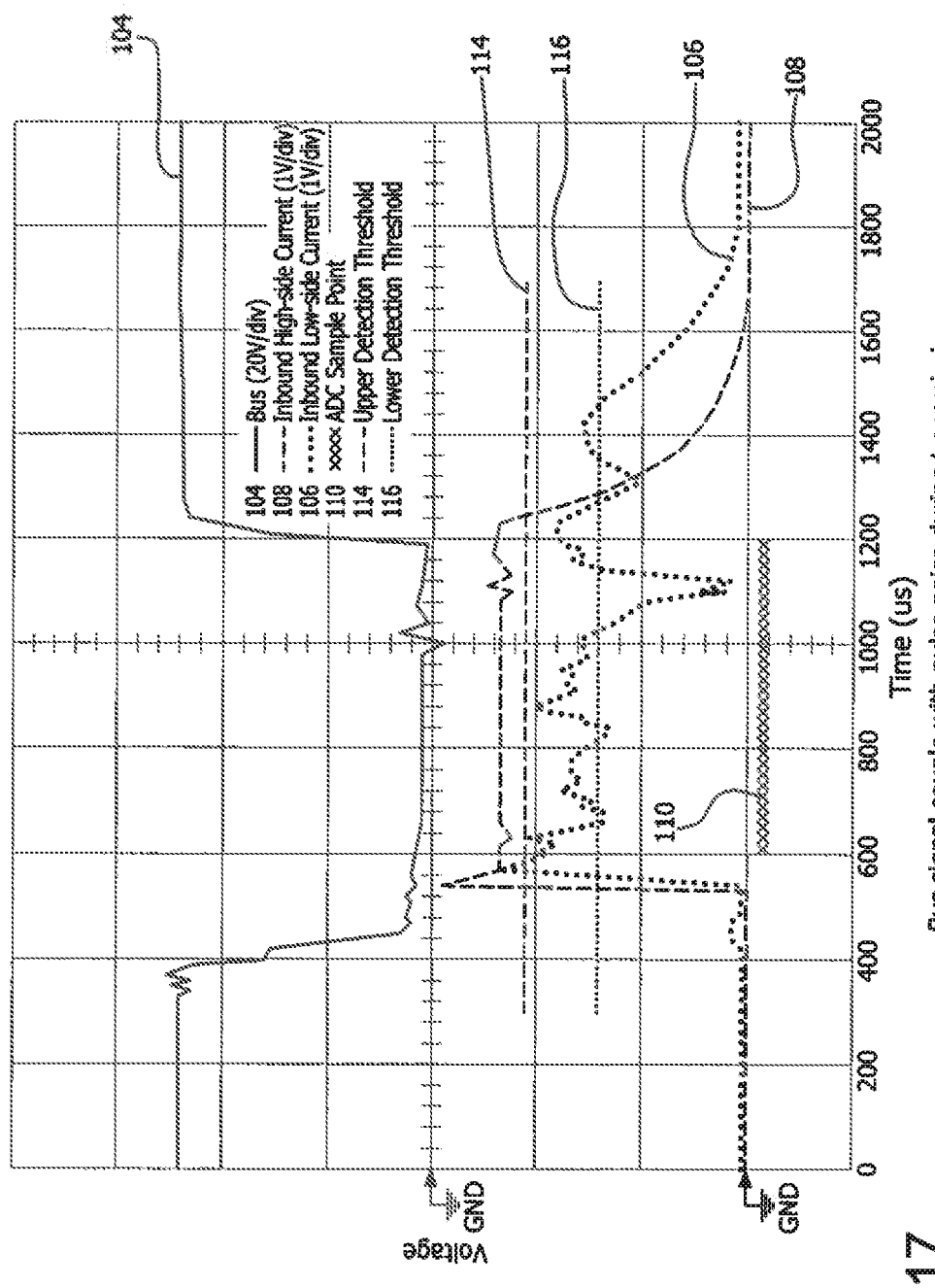
FIG. 17 is a waveform illustrating an example of a data communication bus signal of the I/O and control system, and outputs from the high side current sense circuit and the low side current sense circuit, in the presence of pulse noise during transmission, and upper and lower detection levels for valid transmission detection in accordance with an embodiment of the present invention.

It was determined from the afore-mentioned testing and modelling that it is not optimal to require all samples to be above the minimum floor values 114 and 116 for a set number of samples. This is because, if any one sample was below the floor 114 or 116, the requisite sample count would be reset and restarted. The requisite sample count can be a configurable parameter setting in the channel generator 12. Testing also determined that noise could cause a momentary dip below the floor level 114 or 116, which would then make meeting the minimum requisite number of samples more difficult for a positive incoming message. For example, FIG. 17 illustrates how the low current detect signal (106) may drop below even the low side floor level 116 momentarily during signal sampling. In this case, the microcontroller 36 in the channel generator 12 (e.g., a MSP430 microprocessor) is sampling both signal lines at a rate of approximately 12.5 us. The transitions (e.g., high to low, and low to high) on the trace (110) indicate the sampling windows. As illustrated in FIG. 17, if all samples of the low side current detector trace (e.g., 106) had to be above the lower detection floor 116, the inbound transmission would have been discarded. Accordingly, the dual line inbound detection algorithm can include averaging the current samples to reduce the impact of spurious ADC readings and eliminate the need to restart the minimum requisite samples count, which in turn reduces the probability of valid inbound transmissions being discarded. For the case of the low side current detector trace (e.g., 106) in FIG. 17, the average of the samples would have been above the lower floor and the transmission considered valid.

Figure 18:
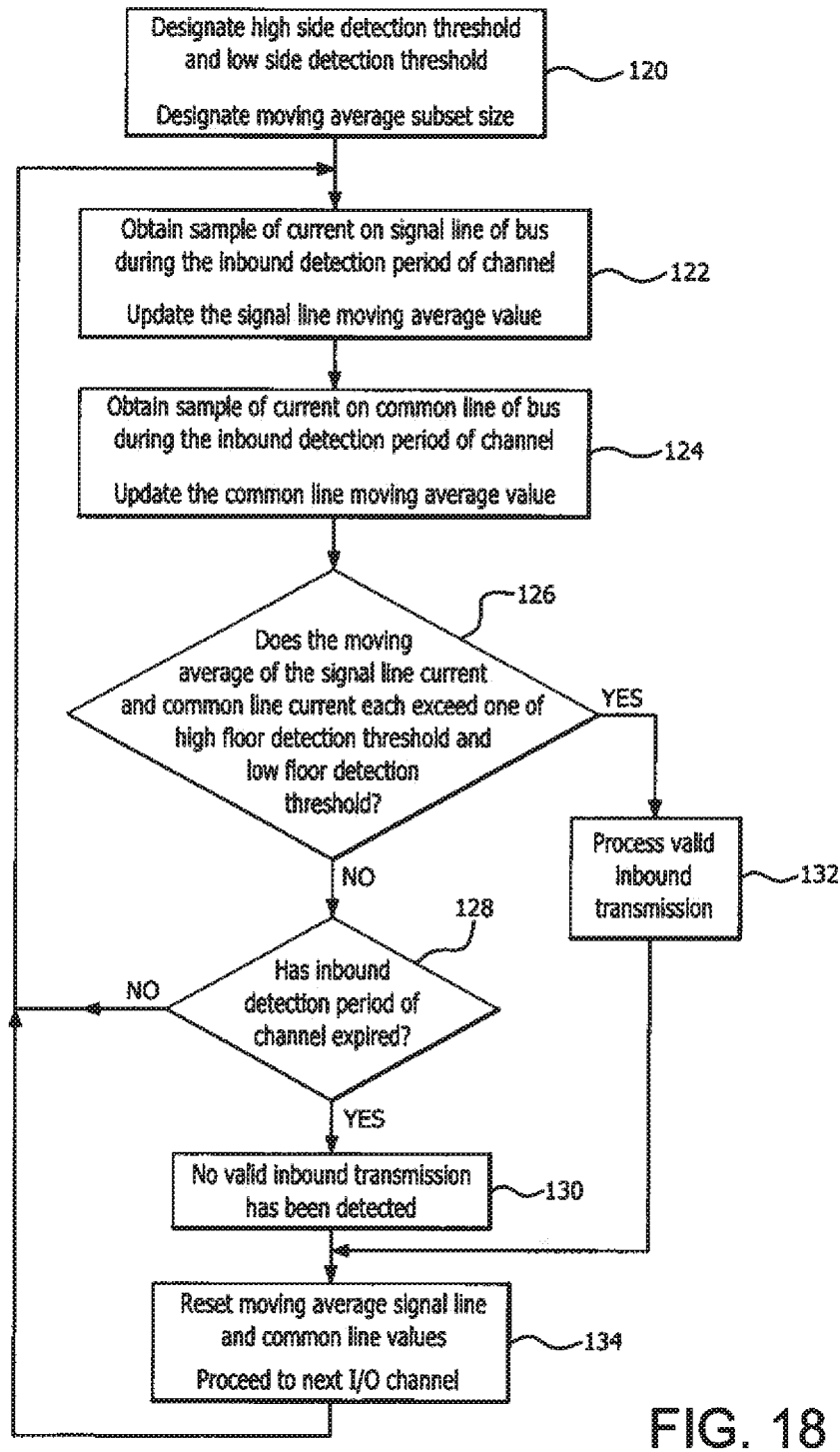
FIG. 18 is a flow chart illustrating operations to detect valid transmissions on the data communication bus in accordance with an embodiment of the present invention.

The dual line inbound detection algorithm will now be described with reference to the illustrative embodiment in FIG. 18. For example, the microcontroller 36 in the channel generator 12 can be programmed to execute the algorithm whereby a high side detection threshold and a low side detection threshold are designated such as dynamically configured or preconfigured, as shown in block 120. For example, the channel generator 12 can be configured to dynamically set the threshold and number of samples for the moving average. By monitoring the inbound current of channels known to be transmitting an inbound signal, a high threshold may be determined over a period of time. Likewise, by monitoring the inbound current of channels known not to be transmitting, then a low threshold may be determined which is above the level of any noise on the signal line. The microcontroller 36 can then be provided with samples of the outputs from the current detection circuits 84 and 64, for example, as shown in blocks 122 and 124. As described above, the samples can be averaged.

In accordance with an embodiment of the dual line inbound detection algorithm, the current detected on the signal line and the common line by the detectors 84 and 86 is compared with the designated high side detection threshold and low side detection threshold (e.g., thresholds 114 and 116 in FIGS. 16 and 17). As long as the current detected on the signal line exceeds one of the high side detection threshold and low side detection threshold and the current detected on the common line exceeds the other one of the high side detection threshold and low side detection threshold per block 126, a valid inbound transmission is detected (block 132); otherwise, no valid inbound transmission is detected once the inbound detection period of the channel has expired (blocks 128 and 130). The moving average signal line value and moving average common line value are then reset, and the microcontroller 36 proceeds to process the next I/O channel (block 134).

As stated above, the microcontroller 36 in the channel generator 12 operates in accordance with the dual line inbound detection algorithm to determine the state of the field devices 22 in the system 10 by using current drawn when the system bus 20 is driven to the low voltage level (e.g., the low voltage level portion that precedes the high voltage pulse in the channel window of a field device's designated I/O channel). Once a determination is made as described with reference to block 126 in FIG. 18, the microcontroller 36 proceeds to the next I/O channel in the pulse train on the bus 20 to look for a valid inbound transmission from the corresponding field device 22. Further, the algorithm can control the microcontroller 36 to disable the low side current detector 86 (e.g., via the MOSFET 96) when the bus signal is at the high voltage level, as described above.

The dual line inbound detection algorithm has been described as implemented, for example, via a microcontroller 36 in the channel generator 12. It is to be understood that some or all of the detectors 86 and 84, amplifier 102 and a processing device programmed to implement the dual line inbound detection algorithm can be incorporated into one or more of the components of the channel generator 12 or can be implemented in one or more components that are external to channel generator 12.

Additional Embodiments and Implementations

Illustrative embodiments of the present invention have been described with reference to operations at a programmable device such as a channel generator 12 or I/O module or device 22, or a separate processing device for using high side and low side current detector outputs and a dual line inbound detection algorithm. It is to be understood, however, that the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, DVDs, magnetic tapes, floppy disks, optical data storage devices. It is envisioned that aspects of the present invention can be embodied as carrier waves (such as data transmission through the Internet via wired or wireless transmission paths). The computer-readable recording medium can also be distributed over network-coupled computer systems so that the computer-readable code is stored and executed in a distributed fashion.

The components of the illustrative devices, systems and methods employed in accordance with the illustrated embodiments of the present invention can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the present invention can be easily construed as within the scope of the invention by programmers skilled in the art to which the present invention pertains. Method steps associated with the illustrative embodiments of the present invention can be performed by one or more programmable processors executing a computer program, code or instructions to perform functions (e.g., by operating on input data and/or generating an output). Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The above-presented description and figures are intended by way of example only and are not intended to limit the present invention in any way except as set forth in the following claims. It is particularly noted that persons skilled in the art can readily combine the various technical aspects of the various elements of the various illustrative embodiments that have been described above in numerous other ways, all of which are considered to be within the scope of the invention.

What is claimed is:

1. A method of determining whether inbound transmissions to a control unit from field devices are valid, the field devices being connected to the control unit via a bus comprising at least a signal line and a common line, the method comprising:
   generating via the control unit a pulse train comprising a plurality of cycles for transmission on the bus, each of the cycles comprising a first voltage level portion for a designated period of time and a second voltage level portion for a designated period of time, and at least some of the cycles corresponding to respective channel windows assigned to respective ones of the field devices as I/O channels, each of the field devices being configured to indicate an inbound transmission to the control unit during a designated portion of its corresponding cycle;
   designating a high side detection threshold and a low side detection threshold;
   sampling current on the signal line;
   sampling current on the common line; and
   determining that an inbound transmission on the bus is valid when current detected on the signal line exceeds one of the high side detection threshold and the low side detection threshold, and current detected on the common line exceeds the other one of the high side detection threshold and the low side detection threshold.

2. The method of claim 1, further comprising
   using at least part of the designated portion in each of the I/O channels to be that channel's inbound detection period;
   determining, for one of the I/O channels, an average for a designated number of samples of the current detected on the signal line during that I/O channel's inbound detection period;
   determining an average for a designated number of samples of the current detected on the common line during that I/O channel's inbound detection period; and
   determining an inbound transmission to be valid if one of averages comprising the average of the samples from the common line and the average of the samples from the signal line is greater than the high side signal threshold and the other one of the averages is greater than the low side signal threshold.

3. The method of claim 2, further comprising:
   designating a moving average value for at least one of the signal line and the common line used to determine an average;
   updating the moving average after a sample of current is obtained from the at least one of the signal line and the common line; and
   when the inbound detection period for that I/O channel has expired and no valid inbound transmission has been detected, resetting the moving average value.

4. The method of claim 1, wherein the high side detection threshold and the low side detection threshold are dynamically configured, further comprising:
   monitoring inbound current on the bus from corresponding ones of the field devices known to be transmitting to the control unit and determining the high side detection threshold using their monitored inbound current; and
   monitoring inbound current on the bus from corresponding ones of the field devices known to not be transmitting to the control unit and determining the low side detection threshold using their monitored inbound current.

5. The method of claim 1, further comprising:
   generating, via the control unit, a pulse train comprising a plurality of cycles for transmission on the bus, at least some of the cycles corresponding to respective channel windows assigned to respective ones of the field devices as I/O channels, each of the field devices being configured to indicate an inbound transmission to the control unit during a designated portion of its corresponding cycle that is that I/O channel's inbound detection period;
   the sampling current on the signal line comprising obtaining, for one of the I/O channels, a sample of current on the signal line during that I/O channel's inbound detection period, and updating a signal line average value using the sample of current;
   the sampling current on the common line comprising obtaining, for that I/O channel, a sample of current on the common line during the inbound detection period, and updating a common line average value using the sample of current; and
   the determining comprises determining that an inbound transmission on the bus is valid when one of the signal line average value and the common line average value is greater than the high side signal threshold and the other one of the signal line average value and the common line average is greater than the low side signal threshold.

6. The method of claim 5, further comprising:
   repeating the sampling current on the signal line, the sampling current on the common line, and the determining whether an inbound transmission on the bus is valid until that I/O channel's inbound detection period is expired;
   resetting the signal line average value and the common line average value when the inbound detection period for that I/O channel has expired and no valid inbound transmission has been detected, resetting the moving average value; and
   selecting the next I/O channel and repeating the sampling current on the signal line, the sampling current on the common line, and the determining until the next I/O channel's inbound detection period is expired.

7. An inbound transmission detection device for use in a system comprising field devices connected to a control unit via a bus comprising at least a signal line and a common line, the bus transmitting a pulse train comprising a plurality of cycles, at least some of the cycles corresponding to respective channel windows assigned to respective ones of the field devices as I/O channels, each of the field devices being configured to indicate an inbound transmission to the control unit during a designated portion of its corresponding cycle that is that I/O channel's inbound detection period, the inbound transmission detection device comprising:
   at least one current sensing circuit for sensing current in the signal line and current in the common line, respectively;

a processor;

an amplifier circuit for processing the output of the at least one current sensing circuit and providing corresponding sensed current data to the processor; and a memory storing instructions that, when executed by the processor cause the inbound transmission detection device to:

designate a high side detection threshold and a low side detection threshold;

sample current on the signal line using the sensed current data, during at least one of the I/O channel's inbound detection period;

sample current on the common line using the sensed current data, during that I/O channel's inbound detection period; and determine that an inbound transmission on the bus from that I/O channel is valid when current detected on the signal line exceeds one of the high side detection threshold and the low side detection threshold, and current detected on the common line exceeds the other one of the high side detection threshold and the low side detection threshold.

8. The inbound transmission detection device of claim 7, wherein the execution of the instructions further causes the inbound transmission detection device to:

obtain, for that I/O channel, a sample of current on the signal line during that I/O channel's inbound detection period, and update a signal line average value using the sample of current;

obtain, for that I/O channel, a sample of current on the common line during the inbound detection period, and update a common line average value using the sample of current; and determine that an inbound transmission on the bus is valid when one of the signal line average value and the common line average value is greater than the high side signal threshold and the other one of the signal line average value and the common line average is greater than the low side signal threshold.

9. The inbound transmission detection device of claim 8, further comprising:

repeating the obtain a sample of current on the signal line, the obtain a sample of current on the common line, and the determine whether an inbound transmission on the bus is valid until that I/O channel's inbound detection period is expired;

resetting the signal line average value and the common line average value when the inbound detection period for that I/O channel has expired and no valid inbound transmission has been detected, resetting the moving average value; and selecting the next I/O channel and repeating the sampling current on the signal line, the sampling current on the common line, and the determining until the next I/O channel's inbound detection period is expired.

10. The inbound transmission detection device of claim 7, wherein the signal line and the common line have respective ones of a high voltage level and a low voltage level, the at least one current sensing circuit comprises a high side current detector connected to the signal line and configured to measure the bus when a bus signal is at the high voltage level, and a low side current detector connected to the common line and configured to measure the bus when a bus signal is at the low voltage level, and the processor is configured to disable the low side current detector when the bus signal is at the high voltage level.

11. The inbound transmission detection device of claim 7, wherein inbound transmission detection device has an implementation chosen from integrated in the control unit, and disposed externally with respect to the control unit and connected to the control unit.

* * * * *